(12) United States Patent
Shikata et al.

(10) Patent No.: US 6,213,198 B1
(45) Date of Patent: Apr. 10, 2001

(54) AIR CONDITIONING APPARATUS FOR VEHICLE WITH THERMOELECTRIC DEHUMIDIFIER IN A DOUBLE LAYER SYSTEM

(75) Inventors: Kazushi Shikata; Yukio Uemura; Kenji Suwa, all of Kariya; Hiroshi Nonoyama, Toyota; Hikaru Sugi, Nagoya; Manabu Miyata, Obu; Yuichi Shirota, Anjo, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 08/763,357

(22) Filed: Dec. 11, 1996

(30) Foreign Application Priority Data

| Dec. 13, 1995 | (JP) | ................................................... 7-324810 |
| Jan. 16, 1996 | (JP) | ................................................... 8-004964 |
| Feb. 20, 1996 | (JP) | ................................................... 8-032409 |
| Jun. 24, 1996 | (JP) | ................................................... 8-163413 |

(51) Int. Cl.[7] .................................................. F25B 29/00
(52) U.S. Cl. .................... 165/202; 165/203; 165/222; 165/42; 165/43; 62/3.61; 62/3.3; 62/3.4; 454/161; 237/12.3 A
(58) Field of Search .................. 62/3.2, 3.3, 3.4, 62/3.61; 165/202, 203, 42, 43; 237/12.3 A, 12.3 B; 454/161

(56) References Cited

U.S. PATENT DOCUMENTS 3,040,538 * 6/1962 Alsing ...................................... 62/3.4
5,309,731 * 5/1994 Nonoyama et al. ..................... 62/244
5,483,807 * 1/1996 Abersfelder et al. .................... 165/43
5,526,650 * 6/1996 Iritani et al. ............................. 62/90
5,699,960 * 12/1997 Kato et al. ........................ 237/12.3 A

FOREIGN PATENT DOCUMENTS

| 1261628 | * | 9/1989 | (CA) | ..................................... 62/3.4 |
| 3012052 | * | 10/1981 | (DE) | ..................................... 454/161 |
| 2414173 | * | 9/1979 | (FR) | ..................................... 62/3.3 |
| 0949123 | * | 2/1964 | (GB) | ..................................... 62/3.3 |
| 59-161695 | * | 9/1984 | (JP) | ..................................... 62/3.4 |
| 60-8105 | | 1/1985 | (JP) . | |
| 0085010 | * | 3/1990 | (JP) | ..................................... 62/361 |
| 5-124426 | | 5/1993 | (JP) . | |
| 6-143996 | | 5/1994 | (JP) . | |

OTHER PUBLICATIONS

ATZ Automobiltechnische Zeitschrift 97 (1995) 2, pp. 72–77.

* cited by examiner

Primary Examiner—John K. Ford
(74) Attorney, Agent, or Firm—Harness, Dickey & Pierce, PLC

(57) ABSTRACT

An electric element (Peltier element composite) is disposed in a boundary between an outside air introduction passage and an inside air introduction air passage (114). The Peltier element composite absorbs heat from the inside air in the inside air introduction passage to cool and dehumidify the inside air and radiates heat to outside air in the outside air introduction passage. The inside air and outside air are blown out from a defroster air outlet through a second air passage. In this way, it is possible to increase an amount of introduced inside air and to improve the heating performance while maintaining the defrosting performance.

3 Claims, 18 Drawing Sheets

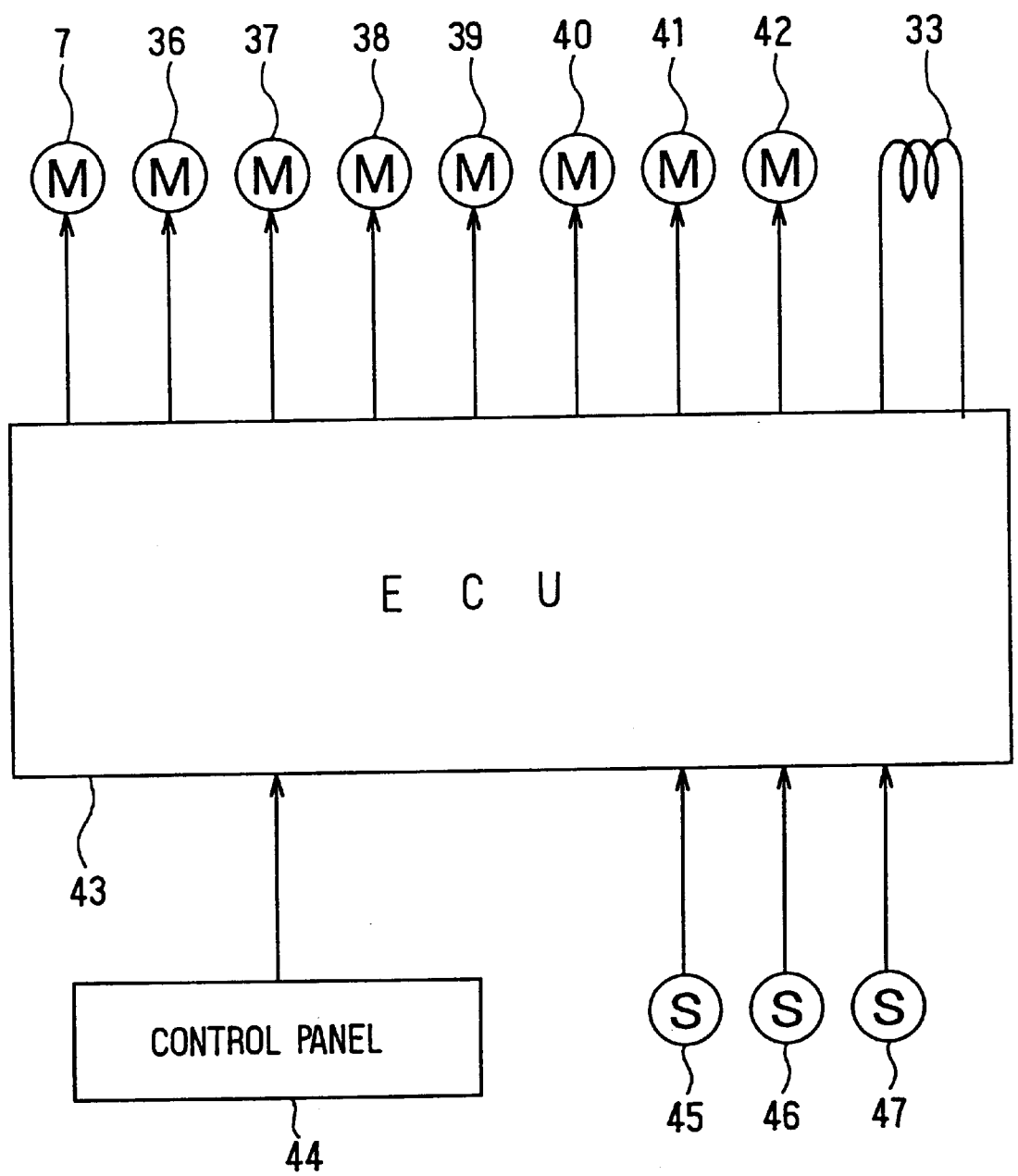

AIR CONDITIONING APPARATUS FOR VEHICLE WITH THERMOELECTRIC DEHUMIDIFIER IN A DOUBLE LAYER SYSTEM

CROSS REFERENCE TO THE RELATED APPLICATIONS

This application is based on and claims priority of Japanese Patent Application Nos. Hei. 7-324810 filed on Dec. 13, 1995, Hei. 8-4964 filed on Jan. 16, 1996, Hei. 8-32409 filed on Feb. 20, 1996, Hei. 8-163413 filed on Jun. 24, 1996, the content of which are incorporated herein by reference.

BACKGROUND OF THE INVENTION

1. Field of the Invention

The present invention relates to an air conditioning apparatus for a vehicle, capable of improving the defrosting performance of the windshield as well as the heating performance for the passenger compartment.

2. Description of Related Art

Conventionally, an air conditioner for a vehicle, of the above type, has been disclosed in JP-A-5-124426. In an air conditioning case of this air conditioner for a vehicle, there are formed an inside air inlet and an outside air inlet on one end side and formed on the other end side a foot air outlet, a defroster air outlet, and a face air outlet.

In the air conditioning case, there is provided a partitioning plate which partitions an interior thereof into a first air passage extending from the inside air inlet to the face air outlet and the foot air outlet and a second air passage extending from the outside air inlet to the defroster air outlet.

When the heating of the passenger compartment is performed while defrosting the windshield, there is selected a foot/def mode in which the outside air sucked from the outside air suction inlet is blown out from the defroster air outlet toward the windshield through the first air passage, and inside air sucked from the inside air suction inlet is blown out from the foot air outlet toward the foot of the passenger in the passenger compartment through the second air passage.

In this way, since the outside air having a low humidity is blown out to the windshield, the defrosting performance of the windshield is improved. Further, since the inside air having been already heated is sucked into the second air passage, the heating load of a heating heat exchanger provided in the second air passage is reduced, and as a result the heating performance is improved.

Recently, in vehicles (such as diesel vehicles, electric motor vehicles, etc.) which are hard to secure the sufficient heating performance, it is strongly demanded that the heating load in the heating heat exchanger should be further reduced.

SUMMARY OF THE INVENTION

In view of the above problem, an object of the present invention is to provide an air conditioning apparatus for a vehicle, capable of satisfying the aforementioned demand.

Generally, for defrosting the windshield, it is necessary to blow out a predetermined amount of air having a low humidity toward the windshield from the defroster opening.

Accordingly, in the air conditioning apparatus where the outside air is blown out to the windshield through a first air passage, and inside air is blown out to feet of a passenger through a second air passage, it is necessary to blow out a predetermined amount of air having a low humidity toward the windshield through the first air passage.

To satisfy the above-described demand, according to the present invention, the predetermined amount of air is not formed by only the outside air having a low humidity, but is formed by the outside air having a low humidity in a first air passage and the inside air having a low humidity having been dehumidified by dehumidifying means, which is mixed into the first air passage through an inside air mixing passage. In the present invention, a ventilation load can be reduced while maintaining the defrosting performance of the windshield, and as a result the heating capacity can be increased.

Further, in the present invention, only the inside air in the inside air mixing passage is dehumidified by the dehumidifying means, and therefore the dehumidifying means can be downsized as compared with the case where the inside air in the inside air mixing passage and the second air passage are respectively dehumidified.

The dehumidifying means may be constituted by an electric element. In this way, even if a temperature difference between the inside air in the inside air mixing passage and the outside air in the first air passage is small, the dehumidifying capacity on the heat absorbing side of the electric element can be fully performed by adjusting an amount of electric current charged to the electric element.

Further, determining means may determine conditions for blowing out a low humidity conditioned air from the defroster opening. When the conditions are determined by the determining means, the electric element is operated.

In this way, when the dehumidification is necessary, the electric element is automatically operated. Therefore, the operating burden for the passenger is eliminated, and the dehumidifying operation is automatically performed by the electric element, when the dehumidification is necessary.

The dehumidifying means may include water adsorbing means for adsorbing water in the inside air.

Further, a sub-passage leading to the outside of the first air passage may be formed, and the water adsorbing means of the dehumidifying means may be provided so as to face the inside air mixing passage and the sub-passage. In addition, heating means for heating air may be provided at a part on an upstream air side of the water adsorbing means provided in the sub-passage, and switching means for switching so that water adsorbing means provided in the inside air mixing passage is provided in the sub-passage and for switching so that water adsorption means provided in the sub-passage may be provided in the inside air mixing passage.

In this way, the water adsorption means provided in the first inside air passage keeps on adsorbing water of air in the inside air mixing passage, and an amount of adsorbed water gradually increases, and the adsorption capacity gradually lowers. The switching means switches the water adsorption means provided in the inside air mixing passage to be provided in the sub-passage.

Then, when the water adsorbing means is switched to be provided in the sub-passage, since heating means is provided at an upstream side of the water adsorbing means, air heated by the heating means passes through the water adsorbing means. The water adsorbed to the water adsorbing means is evaporated by heat exchange with heat of the high temperature air and is emitted. Thus, the water adsorbing means switched to be provided in the sub-passage is again reproduced to the adsorbable state.

Since the water adsorbing means reproduced to the adsorbable state in the sub-passage is switched to be provided in the first inside air passage by the switching means, it can again adsorb water in air in the inside air mixing passage.

As described above, in the present invention, the switching of the position of the water adsorbing means is repeatedly performed by the switching means, and therefore a water adsorbing operation in the inside air mixing passage by the water adsorbing means can be repeatedly performed. Since only the air in the sub-passage is heated by the heating means, the capacity of the heating means can be reduced as compared with the case where all the air to be blown out into the passenger compartment are heated.

BRIEF DESCRIPTION OF THE DRAWINGS

Additional objects and advantages of the present invention will be more readily apparent from the following detailed description of preferred embodiments thereof when taken together with the accompanying drawings in which:

FIG. 3 is a block diagram of the control system according to the first embodiment;

DETAILED DESCRIPTION OF THE PREFERRED EMBODIMENTS

A first embodiment will be described hereinafter with reference to FIGS. 1 to 6 in which the present invention is applied to an air conditioning apparatus for a diesel vehicle suitable for a cold district.

Figure 1:
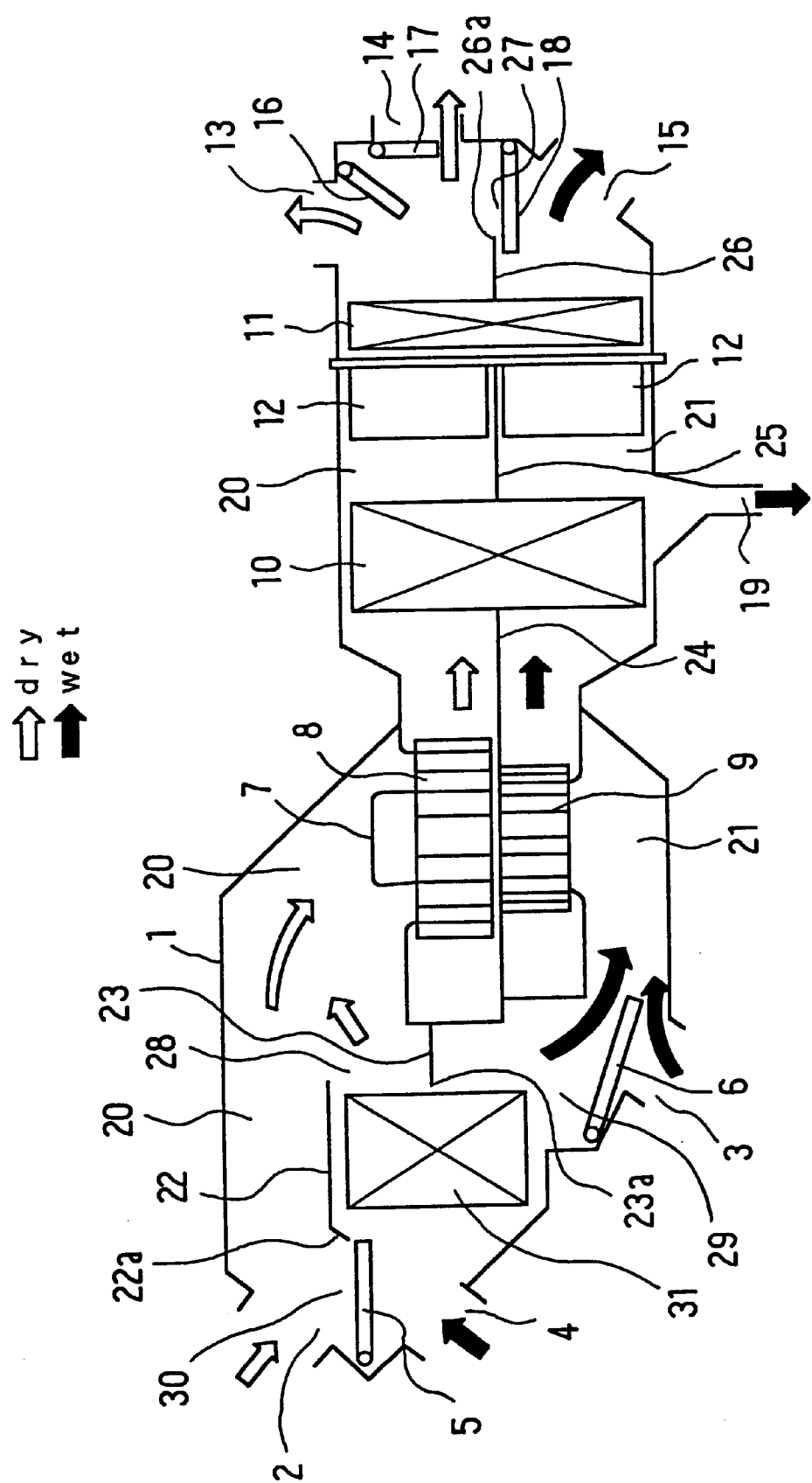
FIG. 1 is a structural view of an entire ventilation system according to a first embodiment.

FIG. 1 is a construction view schematically showing an entire ventilation system in this embodiment. In FIG. 1, an air conditioning casing 1 is formed at one end side with an outside air suction inlet 2 for sucking outside air, a first inside air suction inlet 3 and a second inside air suction inlet 4 for sucking inside air. In the air conditioning casing 1, there is provided an inside and outside air switching door 5 for selectively opening or closing the outside air suction inlet 2 and the second air suction inlet 4 and an inside closing door 6 for opening or closing the first inside air suction inlet 3. These doors 5 and 6 are driven by drive means 36 and 37 (more specifically, servomotors, see FIG. 3), respectively.

In the air conditioning casing 1, there is further provided a first fan 8 and a second fan 9 which are driven by the same blower motor 7. The first fan 8 generates an air flow toward a defroster opening 13 or a face opening 14 (described later) in a first air passage 20 (described later). The first fan 9 generates an air flow toward a foot opening 15 (described later) in a second air passage 21 (described later). In this embodiment, a diameter of the first fan 8 is larger than that of the second fan 9.

An evaporator 10 for cooling air in the air conditioning casing 1 is provided at a downstream air side of the fans 8 and 9 in the air conditioning casing 1. The evaporator 10 is provided in the air conditioning casing 1 in such a manner that all the air in the air conditioning casing 1 passes through the evaporator 10. The evaporator 10 is a heat exchanger which constitutes a refrigeration cycle with a condenser (not shown), pressure reducing means (not shown) in addition to a compressor (not shown) driven by an engine of the vehicle.

A heater core 11 (heating heat exchanger) for heating air in the air conditioning casing 1 is provided at a downstream air side of the evaporator 10 in the air conditioning casing 1. The heater core 11 is provided in the air conditioning casing 11 so as to form a bypass passage in which air in the air conditioning casing 1 bypasses the heater core 11. The bypass passage is not shown in FIG. 1, because it is located behind the heater core 11 at the back side of the sheet. The heater core 11 is a heat exchanger in which cooling water of the engine flows, for heating air in the air conditioning casing 1 by using said cooling water as a heat source.

An air mix door 12 for adjusting the ratio between an amount of cool air passing through the heater core 11 and an amount of cool air passing through the bypass passage are disposed at an upstream air of the heater core 11. The air mix door 12 is driven by drive means 38 (more specifically, a servomotor, see FIG. 3).

At the most downstream end of the air conditioning casing 1, there are formed a defroster opening 13, a face opening 14, and a foot opening 15.

A defroster duct (not shown) is connected to the defroster opening 13. The conditioned air introduced into the defroster duct is blown out from a defroster air outlet at the downstream end of the defroster duct toward the inner surface of the windshield.

A center face duct and a side face duct (not shown) are connected to the face opening 14. The conditioned air introduced into the center face duct is blown out from the center face air outlet at the downstream end of the center face duct toward the upper half of the body of the passenger in the passenger compartment, and the conditioned air introduced into the side face duct is blown out from the side face air outlet at the downstream end of the side face duct toward the side windshield.

A foot duct (not shown) is connected to the foot opening 15, and the conditioned air introduced into the foot duct is blown out from the foot air outlet at the downstream end of the foot duct toward feet of the passenger in the compartment.

At upstream air sides of the openings 13 to 15, a defroster door 16, a face door 17 and a foot door 18 are provided, respectively. The defroster door 16 opens or closes an air inflow passage leading to the defroster duct, the face door 17 opens or closes an air inflow passage leading to the center face duct, and the foot door 18 opens or closes an air inflow passage leading to the foot duct.

These doors 16 to 18 are driven by drive means 39 to 41 (more specifically, servomotors, see FIG. 3), respectively.

The air inflow passage leading to the side face duct is not opened or closed by the doors 16 to 18. An air outlet grille (not shown) for opening or closing the side face air outlet, which is manually operated by the passenger, is provided in the vicinity of the side face air outlet, and the air inflow passage leading to the side face duct is opened or closed by the air outlet grille.

A condensed liquid discharge outlet 19 for discharging condensed liquid generated from the evaporator out of the air conditioning casing is formed at a lower position in a direction of gravity of the evaporator 10.

In the air conditioning casing 1, there are provided a first to a fifth partitioning plates 22 to 26 for defining and forming a first air passage 20 extending from the outside air suction inlet 2 to the defroster opening 13 and the face opening 14 and a second air passage 21 extending from the first inside air suction inlet 3 to the foot opening 15 in the air conditioning casing 1 in a foot mode and a foot/def mode. Out of these partitioning plates, the first partitioning plate 22 and the second partitioning plate 23 are detachably mounted in the air conditioning casing 1.

A predetermined gap is provided between one end 26a of the fifth partitioning plate 26 and the inner wall surface of the air conditioning casing 1, and a communication hole 27 for communicating between the first air passage 20 and the second air passage 21 is formed by the gap. The communication hole 27 is opened or closed by the foot door 18.

A predetermined gap is provided between one end 23a of the second partitioning plate 23 and the inner wall surface of the air conditioning casing 1, and the second partitioning plate 23 is shifted toward the second air passage 21 with respect to the first partitioning plate 22.

Accordingly, in the foot mode and the foot/def mode (described later), a first inside air passage 28 extending from the second inside air suction inlet 4 to the first air passage 20 through a passage between the first partitioning plate 22 and the second partitioning plate 23 is formed in the air conditioning casing 1, and a second inside air passage 29 (sub-passage) extending from the second inside air suction inlet 4 to the second air passage 21 through a passage between the second partitioning plate 23 and the inner wall surface of the air conditioning casing 1 is formed.

A predetermined gap is provided between one end 22a of the first partitioning plate 22 and the inner wall surface of the air conditioning casing 1, and a communication hole 30 for communicating between the first air passage 20 and the first air passage 28 is formed by the gap. The communication hole 30 is fully closed by the inside and outside air switching door 5 when the inside and outside air switching door 5 is located at a solid-line position in FIG. 1.

In the air conditioning casing 1, there is provided a drying agent unit 31 is disposed over the first inside air passage 28 and the second inside air passage 29. The drying agent unit 31 is detachably provided on the air conditioning casing 1. The constitution of the drying agent unit 31 will be described with reference to FIG. 2.

Figure 2A:
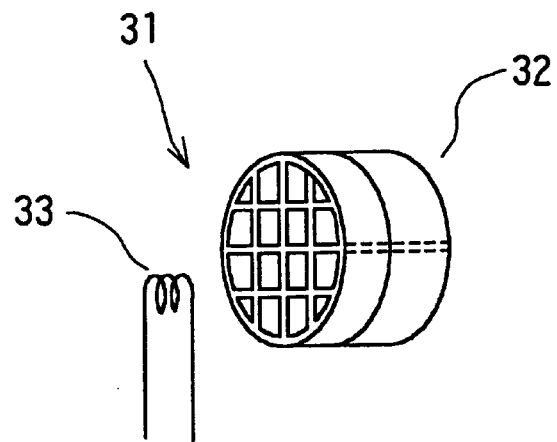
FIG. 2A is a structural view of a drying agent unit 31 according to the first embodiment.

As shown in FIG. 2A, the drying agent unit 31 includes a casing portion 32 disposed over the first inside air passage 28 and the second inside air passage 29, and a heater 33 disposed at an upstream air side of the casing portion 32 in the second inside air passage 29, for heating air when an electric current is supplied thereto.

Figure 2B:
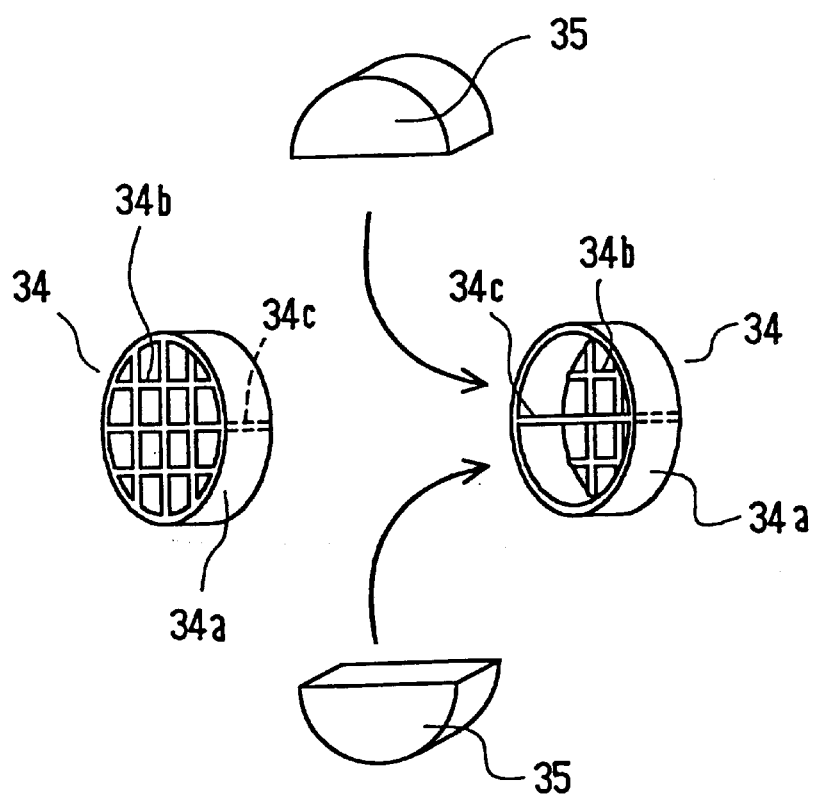
FIG. 2B is an exploded view of a casing portion 32.

Specifically, the casing portion includes, as shown in FIG. 2B, a pair of casings 34 and two drying agent packs 35. The casing 34 is constructed such that a lattice-like portion 34b is provided at the bottom of a hollow cylindrical portion 34a and the center is partitioned into two parts by a plate member 34c. In the drying agent pack 35, a spherical drying agent (specifically, silica gel, not shown) for adsorbing water in air is wrapped by a cloth or a porous member, and is formed in a half columnar shape.

These two drying agent packs 35 are respectively fitted in both chambers partitioned by the plate member 34c of one casing 34. Then, the other casing 34 is opposed to the one casing 34 and these are connected by a claw engagement or a screw, thereby forming the casing portion 32.

Drive means 42 (switching means and moving means, specifically, a servomotor, see FIG. 3) for driving the casing portion 32 along the circumference of the hollow cylindrical portion 34a is connected to the casing portion 32.

The constitution of the control system according to the present embodiment will be described hereinafter with reference to FIG. 3.

Signals from switches (for example, a temperature setting switch for setting a desired temperature, which is operated by the passenger) on a control panel 44 provided on the front surface in the compartment, signals from a group of sensors 45 (for example, an inside air temperature sensor, an outside air temperature sensor, a sunlight amount sensor, and the like) for detecting environmental factors in the passenger compartment, and signals from a first and a second humidity sensors 46 and 47 for detecting air humidities before and behind the drying agent unit 31, respectively, in the first inside air passage 28, are input to a control device 43 for controlling the drive means 7, 36 to 42 and the heater 33.

The control device 43 performs a predetermined operation on the basis of the signals from the control panel 44 and the sensors 45 to 47 and outputs control signals to the drive means 7, 36 to 42 and the heater 33.

An operation in this embodiment will be described in accordance with individual air outlet modes on the basis of the signals from the control panel 44 and the sensors 45 to 47.

(Face Mode)

Figure 4:
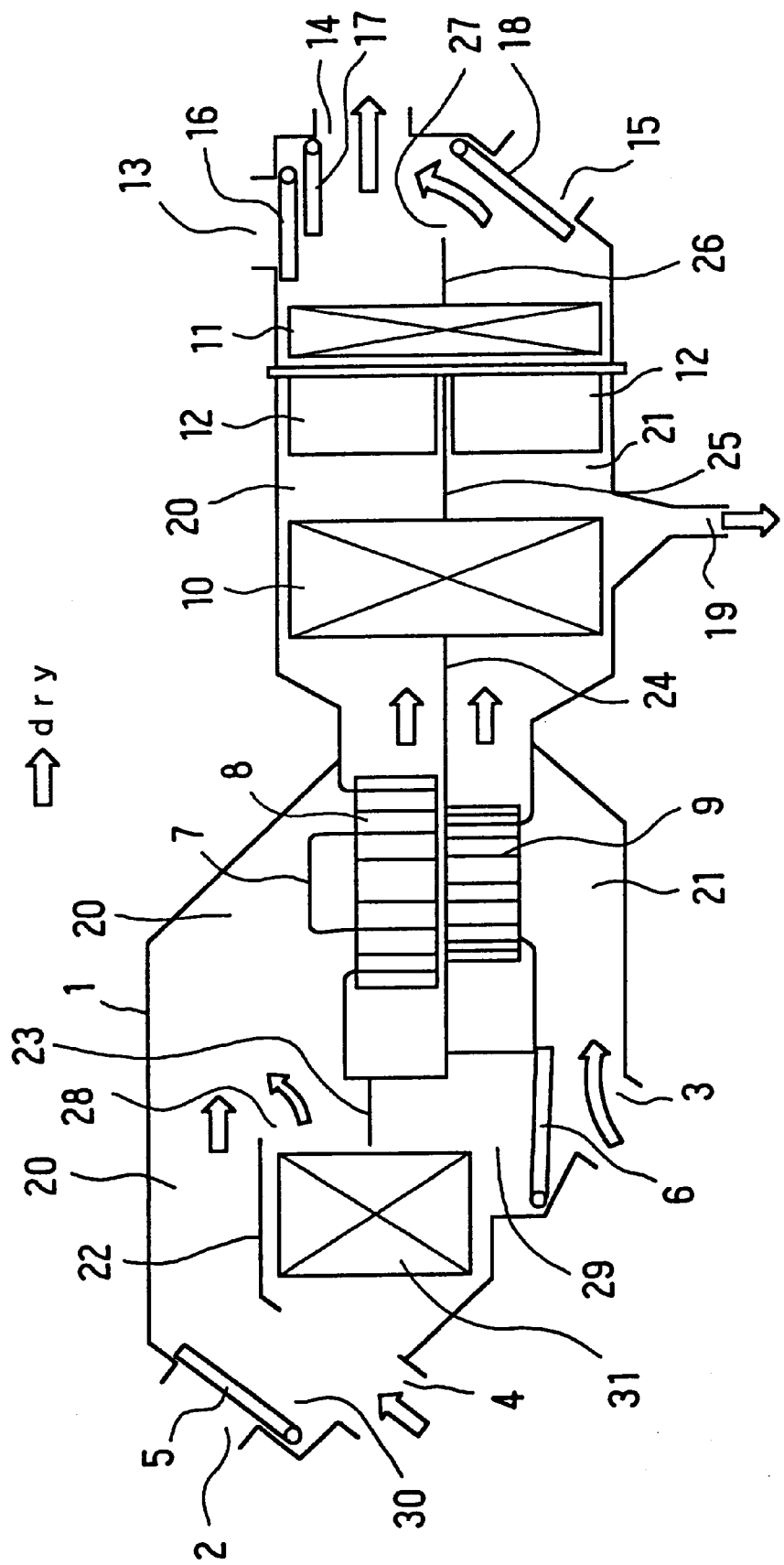
FIG. 4 is an explanatory view of the operation showing the state of the face mode in the first embodiment.

When the air outlet mode is the face mode for blowing out mainly cool air toward the upper half part of the body of an occupant within the compartment, the doors 5, 6, 16 to 18 are controlled to the positions shown in FIG. 4, respectively.

The inside air sucked from the second inside air suction inlet 4 passes through the first air passage 20 and the first inside air passage 28 and leads to the face opening 14. The inside air sucked from the first inside air suction inlet 3 passes through the second air passage 21 and the communication hole 27 and leads to the face opening 14. The inside air led to the face opening 14 is blown out toward the upper half part of the body of the passenger in the passenger compartment through the center face duct. At this time, if the air outlet grille is opened, the inside air is blown out toward the side windshield through the side face duct.

(Bi-Level Mode)

When the air outlet mode is the bi-level mode for blowing out mainly cool air toward the upper half part of the body of the passenger in the compartment and blowing out mainly warm air toward the feet of the passenger in the passenger compartment from the foot air outlet, the doors 5, 6, 16, and 17 are controlled to the position shown in FIG. 4, respectively. The door 18 is controlled to the position in which both the foot opening 15 and the communication hole 27 are opened to some extent.

Accordingly, the inside air sucked from the second inside air suction inlet 4 passes through the first air passage 20 and the first inside air passage 28 and leads to the foot opening 15. The inside air sucked from the first inside air suction inlet 3 passes through the second air passage 21 and also leads to the face opening 14 through the communication hole 27. The inside air led to the face opening 14 is blown out toward the upper half part of the body of the passenger in the compartment and the inside air led to the foot opening 15 is blown out toward the feet of the passenger in the passenger compartment. At this time, if the air outlet grille is opened, the inside air is blown out toward the side windshield through the side face duct.

(Defroster Mode)

Figure 5:
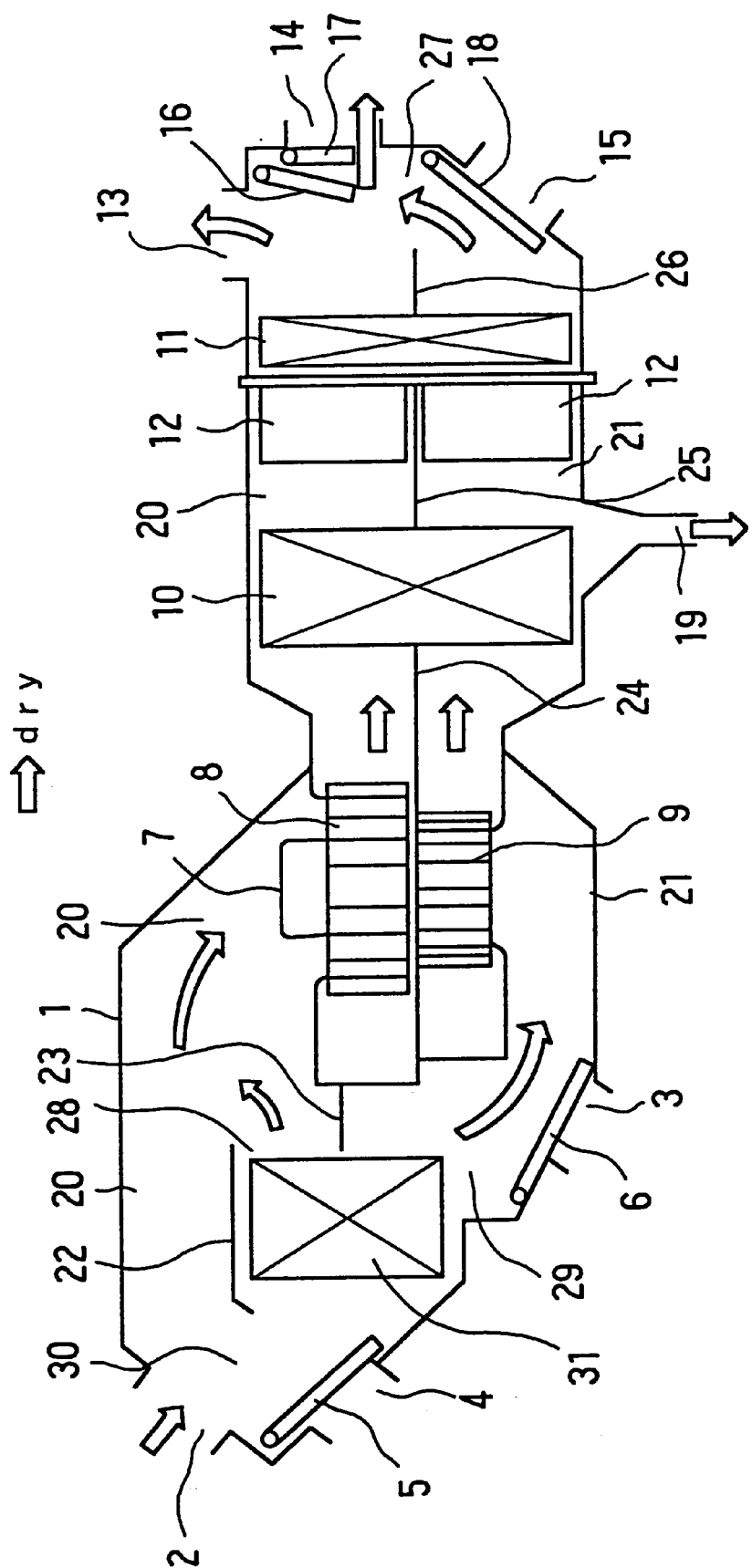
FIG. 5 is an explanatory view of the operation showing the state of the defroster mode in the first embodiment.

When the air outlet mode is the defroster mode for blowing out mainly warm air toward the inner surface of the front windshield, the doors 5, 6, 16 to 18 are controlled to the position shown in FIG. 5, respectively.

Accordingly, the outside air sucked from the outside air suction inlet 2 passes through the first air passage 20 and the first inside air passage 28 and leads to the defroster opening 13. The outside air led to the defroster opening 13 is blown out toward the inner surface of the windshield. At this time, if the air outlet grille is opened, the outside air is blown out toward the side windshield through the side face duct.

(Foot Mode)

When the air outlet mode is the foot mode for blowing out mainly warm air toward the feet of the passenger in the passenger compartment and blowing out a small amount of warm air toward the inner surface of the windshield from the defroster air outlet, the doors 5, 6, 16 to 18 are controlled to the position shown in FIG. 1, respectively.

Accordingly, the outside air sucked from the outside air suction inlet 2 passes through the first air passage 20 and leads to the defroster opening 13. A part of the inside air sucked from the second inside air suction inlet 4 is introduced into the first air passage 20 through the first inside air passage 28 and leads to the defroster opening 13. A mixture of inside and outside air, led to the defroster opening 13, is blown out toward the inner surface of the windshield. At this time, if the air outlet grille is opened, the mixture is blown out toward the side windshield through the side face duct.

Since water in the inside air passing through the first inside air passage 28 is adsorbed by the drying agent pack 35 (FIG. 2) of the drying agent unit 31, the inside air led into the first air passage 20 through the first inside air passage 28 is dried. Accordingly, a rise of air humidity in the first air passage 20 is suppressed, and air having a low humidity is blown out from the defroster air outlet and the side face air outlet.

On the other hand, the inside air sucked from the first inside air suction inlet 3 leads to the foot opening 15 through the second air passage 21. The remaining inside air sucked from the second inside air suction inlet 4 is led into the second air passage 21 through the second inside air passage 29 and leads to the foot opening 15. The inside air led to the foot opening 15 is blown out toward the feet of the passenger in the compartment through the foot duct.

The inside air passing through the second inside air passage 29 is heated by the heater 33 (FIG. 2) into warm air, and passes through the drying agent pack 35 (FIG. 2) of the drying agent pack 31 disposed in the second inside air passage 29. If water is adsorbed in the drying agent pack 35, the water is evaporated by heat-exchange with the warm air and is emitted. In this way, the drying agent pack 35 is again reproduced to an adsorbable state.

However, when the state of the foot mode continues, an amount of water adsorbed in the drying agent pack 35 in the first inside air passage 28 gradually increases so that the adsorption capacity of the drying agent pack 35 gradually lowers. In this case, since a difference between the detection value of the first humidity sensor 46 and the detection value of the second humidity sensor 47 exceeds a predetermined value, after detecting this, the control device 43 rotates the casing portion 32 (FIG. 2) by 180 degrees.

As a result, the drying agent pack 35 having been disposed in the first inside air passage 28 is switched to be disposed in the second inside air passage 29, and the drying agent pack 35 having been disposed in the second inside air passage 29 is switched to be disposed in the first inside air passage 28.

In this way, the drying agent pack 35 reproduced to the adsorbable state in the second inside air passage 29 is disposed in the first inside air passage 28, and the drying agent pack 35 which has adsorbed much water in the first inside air passage 28 is disposed in the first outside air passage 29.

The drying agent pack 35 newly disposed in the first inside air passage 28 again begins to adsorb water in the inside air in the first inside air passage 28, and the drying agent pack 35 newly disposed in the second inside air passage 29 again begins to be reproduced to the adsorbable state.

In the foot mode, suction inlet air amounts from the suction inlets 2 to 4 are 75 ($m^3$/h), 150 ($m^3$/h) and 85 ($m^3$/h), respectively, and amounts of air blown out from the openings 13 to 15 are 60 ($m^3$/h), 90 ($m^3$/h) and 150 ($m^3$/h), respectively. Air of 10 ($m^3$/h) leaks also from the condensed liquid discharge outlet 19.

(Foot/Def Mode)

When the air outlet mode is the foot/def mode for blowing out substantially same amount of warm air from both the foot air outlet and the defroster air outlet, the doors 5, 6, and 17 to 18 are controlled to the position shown in FIG. 1, respectively. The door 16 is controlled to the position at which the inflow air amount into the defroster opening 13 increases as compared with the position shown in FIG. 1. The operation and effect as in the foot mode is the same as in the foot mode.

As described above, in this embodiment, in the foot mode and the foot/def mode for preforming both the defrosting of the windshield and the heating of the passenger compartment, not only the outside air but also the inside air dried by the drying agent unit 31 are sucked into the first air passage 20. Therefore, the heating load of the heater core 11 in the first air passage 20 can be reduced while maintaining the defrosting performance of the windshield.

That is, the heating capacity for the passenger compartment through the first air passage 20 can be improved as compared with the case where only the outside air sucked into the first air passage 20. Therefore, the heating capacity for the entire passenger compartment can be considerably improved through the first and second air passages 20 and 21 accordingly. Accordingly, it is very effective to use an air conditioning apparatus for a vehicle which is economical with fuel, such as a diesel vehicle in which it is difficult to secure a large heating capacity, particularly for a cold district, as in this embodiment.

In this embodiment, since only the inside air in the first inside air passage 20 is dehumidified by the drying agent unit 31, the drying agent unit 31 can be downsized as compared with the case where all the air blown out into the compartment is dehumidified.

In this embodiment, water in the inside air in the first inside air passage 28 is adsorbed by the drying agent pack 35 in the first inside air passage 28 whereas the drying agent pack 35 in the second inside air passage 29 is again reproduced into the adsorbable state, and when the water adsorption amount of the drying agent pack 35 in the first inside air passage 28 exceeds a predetermined amount, the casing portion 32 is rotated by 180 degrees. Therefore, the adsorption of water in the inside air in the first inside air passage 28 by the drying agent pack 35 can be repeatedly performed.

Further, in this embodiment, air having been reproduced by the drying agent pack 35 in the second air passage 29, i.e., warm air having been heated by the heater 33 is not discharged into the compartment but is introduced into the second air passage 21. Therefore, it is possible to effectively utilize the heating amount of the heater 33 for heating the passenger compartment.

Further, in this embodiment, since only the air in the second inside air passage 29 is heated by the heater 33, the capacity of the heater 33 can be reduced as compared with the case where all the air blown out into the compartment is heated.

Figure 6:
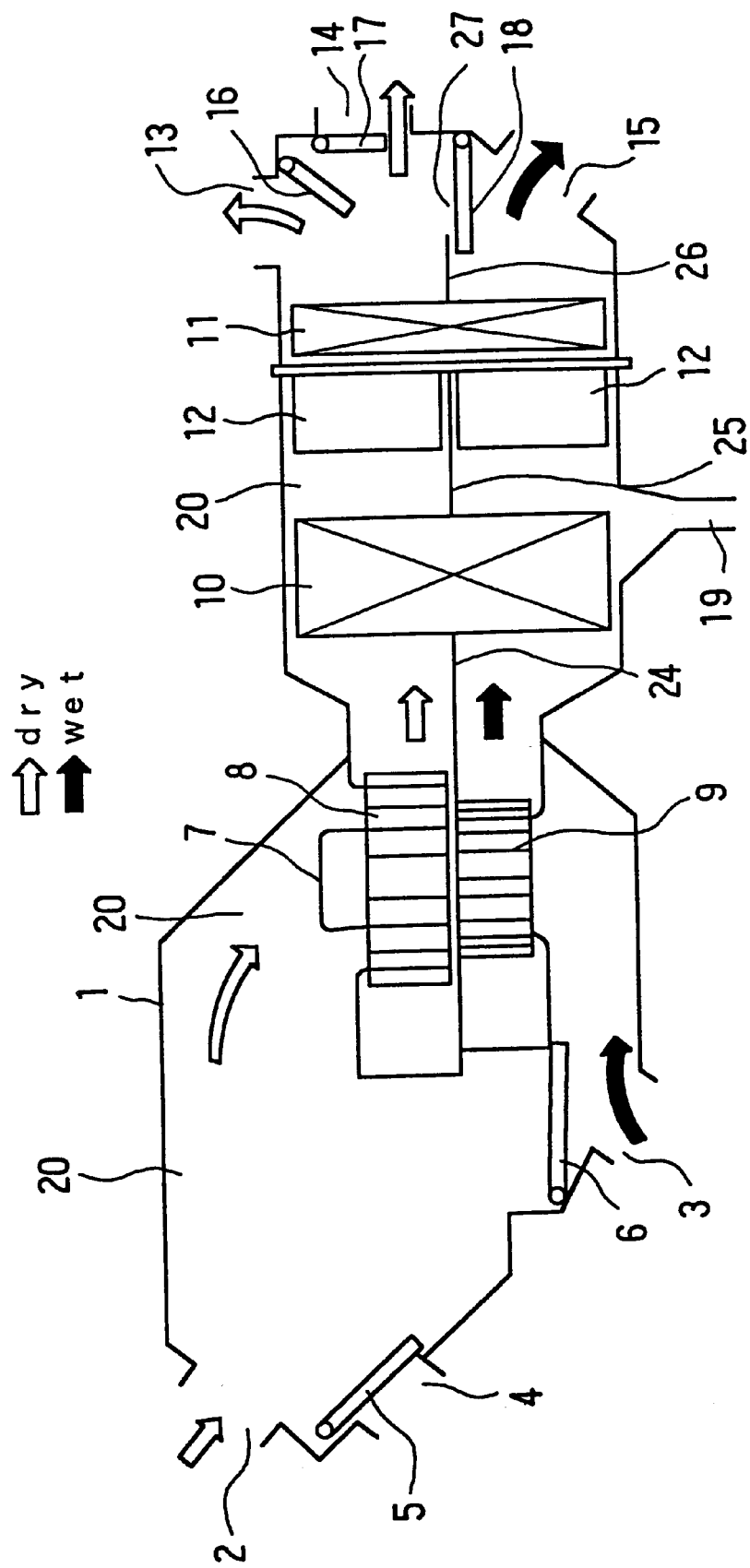
FIG. 6 is a structural view of an entire ventilation system in the case where the first embodiment is used for a standard district.

Since the first partitioning plate 22, the second partitioning plate 23 and the drying agent unit 31 can be detachably mounted on the air conditioning casing 1, these components 22, 23 and 31 are removed from the air conditioning casing 1. In this way, the air conditioning apparatus can be used for the standard district, as shown in FIG. 6. FIG. 6 shows the state of the foot mode.

A second embodiment of the present invention will be described. In this embodiment, only parts or components different from those of the above-described first embodiment will be described.

The drying agent unit 31 may be modified as shown in FIG. 7. That is, there are provided two casing portions 32a and 32b for housing the drying agent pack 35 (FIG. 2) therein, three doors 48 to 50, and a heater 33.

Figure 7A:
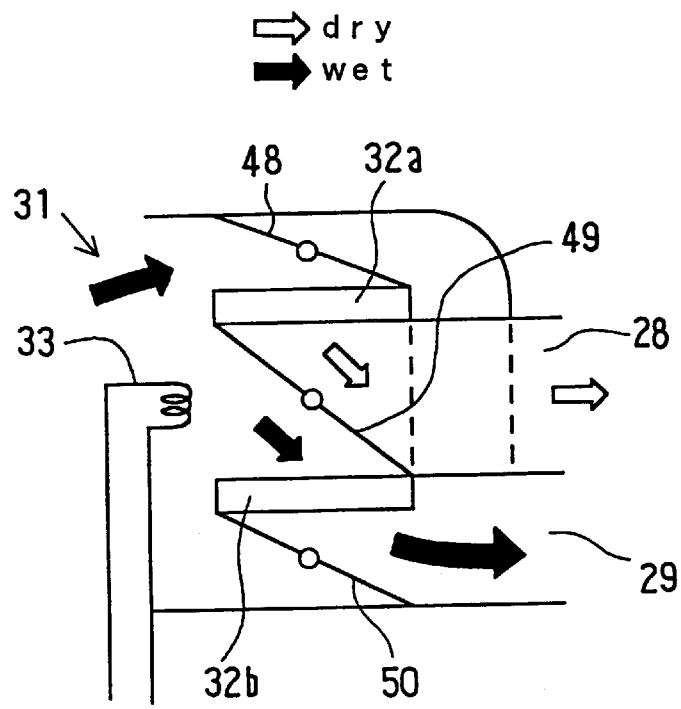
FIGS. 7A and 7B are structural views of a drying agent unit 31 according to a second embodiment.

When the doors 48 to 50 are placed in the state of FIG. 7A, a part of the inside air sucked from the second inside air suction inlet 4 (FIG. 1) passes through the casing portion 32a, and water is adsorbed in the casing portion 32a and led into the first air passage 20 (FIG. 1). That is, the casing portion 32 is placed in the first inside air passage 28.

The remaining inside air sucked from the second inside air suction inlet 4 is heated by the heater 33, then passes through the casing portion 32b to reproduce the casing portion 32b, and is led into the second air passage 21 (FIG. 1). That is, the casing portion 32b is placed in the second inside air passage 29.

Figure 7B:
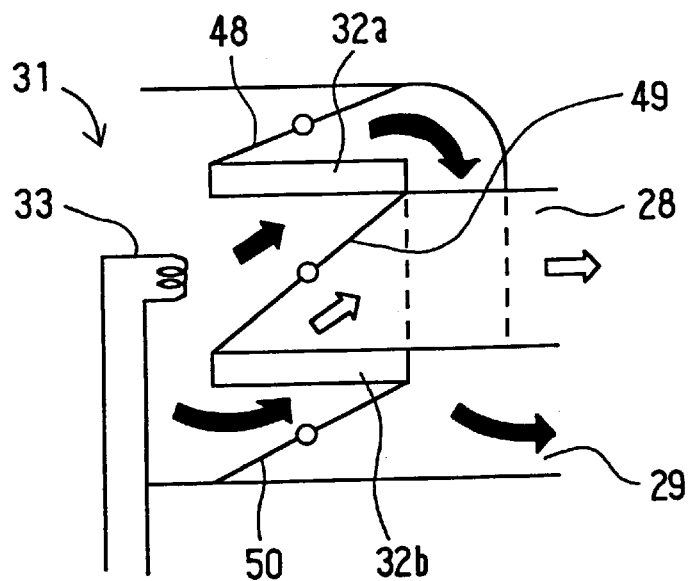

When the doors 48 to 50 are placed as shown in the FIG. 7B, a part of the inside air sucked from the second inside air suction inlet 4 passes through the casing portion 32b, and water is adsorbed in the casing portion 32b and is led into the first air passage 20. That is, the casing portion 32b is switched and placed in the first inside air passage 28.

The remaining inside air sucked from the second inside air suction inlet 4 is heated by the heater 33, then passes through the casing portion 32a to reproduce the casing portion 32a, and is led into the second air passage 21. That is, the casing portion 32a is placed in the second inside air passage 29.

As described above, by repeating the states of FIGS. 7A and 7B, the adsorption of water in the inside air in the first inside air passage 28 by the drying agent unit 31 can be repeated.

In each of the above-described embodiments, when a difference between the detection value of the first humidity sensor 46 and the detection value of the second humidity sensor 47 is equal to a predetermined value or more, the casing portion 32 is rotated or the doors 48 to 50 are driven, however, when a predetermined time has elapsed since the detection value of the second humidity sensor 47 became the predetermined humidity, the casing portion 32 and the doors 48 to 50 may be driven.

Further, in each of the above-described embodiments, the drying agent pack 35 in the second inside air passage 29 is reproduced by the heater 33 for heating air when an electric current is supplied thereto, however, a hot water type heat exchanger may be used in place of the heater 33 to reproduce the drying agent unit 31.

Further, in each of the above-described embodiments, silica gel is used for a drying agent in the drying agent pack 35, however, zeolite may be used.

Further, in each of the above-described embodiments, the present invention is applied to the air conditioning apparatus for a diesel vehicle, however, the present invention may be applied to an air conditioning apparatus for the other vehicles which are economical with fuel or for an electric motor vehicle. In short, the present invention is particularly effective when the present invention is applied to the air conditioning apparatus for vehicles in which it is difficult to secure a heating source.

A third embodiment of the present invention will be described.

An air conditioning apparatus according to the third embodiment is mounted, for example, on a diesel vehicle having a diesel engine mounted thereon. Since the heating amount generated by the diesel engine is generally small as compared with that of a gasoline engine, it is difficult to obtain a sufficient heating capacity in a winter season.

Figure 8:
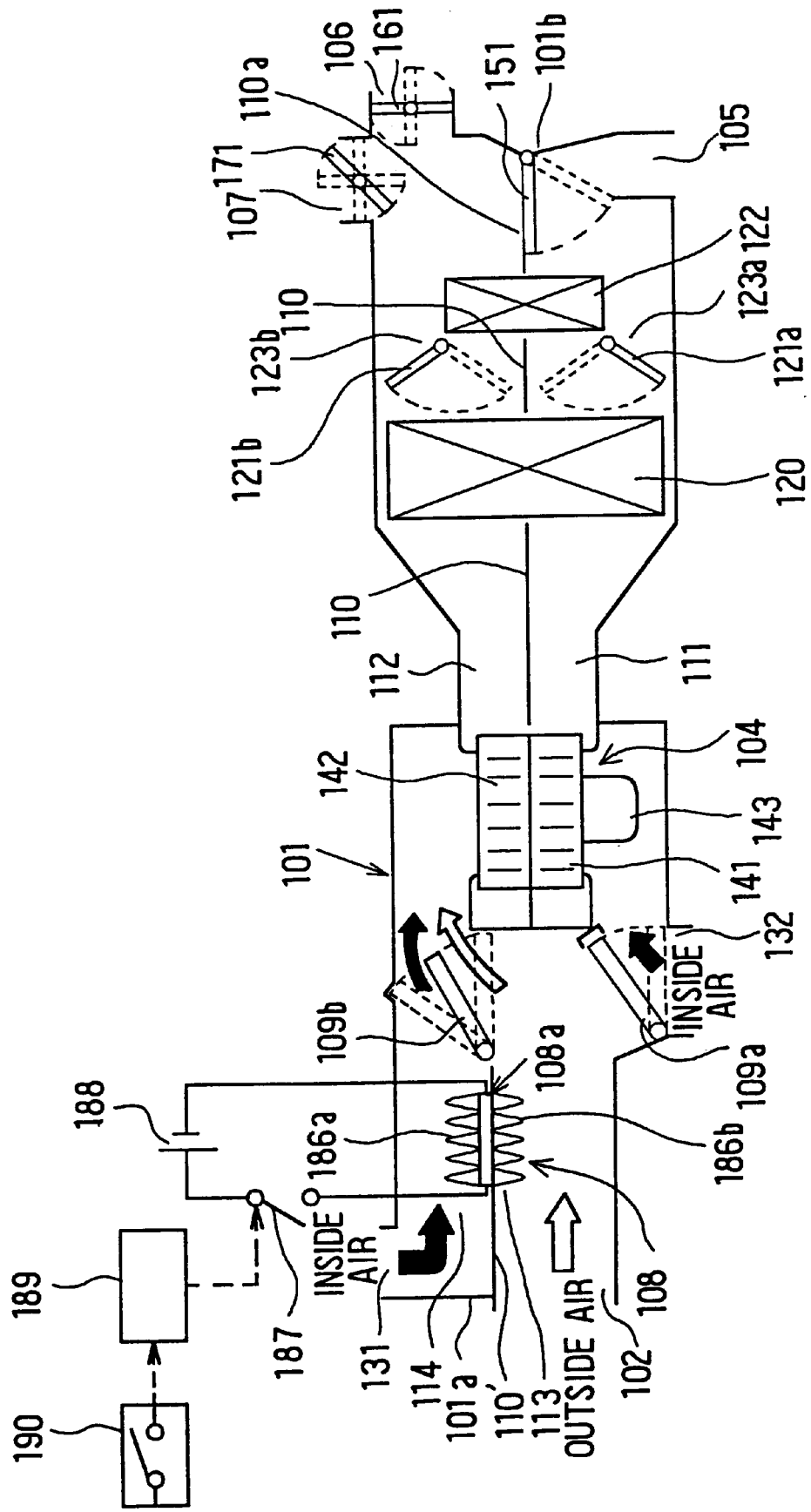
FIG. 8 is a schematic sectional view of an air conditioning apparatus for a vehicle according to a third embodiment of the present invention.

The schematic constitution of the air conditioning apparatus for a vehicle according to the present embodiment will be described with reference to FIG. 8. FIG. 8 is a schematic cross sectional view of the air conditioning apparatus for a vehicle. A front side of the sheet of the drawing is coincident with the upper direction of the vehicle.

The air conditioning apparatus for the vehicle is provided with a casing 101 which forms therein an air passage for introducing air into a passenger compartment. The casing 101 is provided at its one end 101a side with an outside air inlet 102, a first inside air inlet 131, and a second inside air inlet 132, at its other end 101b side with a foot air outlet 105 for blowing out conditioned air toward the feet of a passenger, a face air outlet 106 for blowing out conditioned air toward the upper half part of the body of the passenger, and a defroster air outlet 107 for blowing out conditioned air toward the front windshield.

An interior of the casing 101 at the one end 101a is partitioned into an outside air guide path 113 through which outside air at least from the outside air inlet 102 flows and an inside air guide path 114 through which inside air at least from a first inside air inlet 131 flows, by means of a first partitioning member 110'.

A Peltier element composite (electric element) 108 is disposed on the first partitioning member 110'. The Peltier element composite 108 radiates heat to the outside air in the outside air guide path 113 to heat the outside air, and absorbs heat from the inside air in the inside air guide path 114 to cool and dehumidify the inside air. The construction of the Peltier element composite 108 will be described in detail later. In the casing 101, a portion positioned below the Peltier element composite 108, that is, the deep side of sheet in FIG. 8 is formed with a drain (not shown) for water drops adhered to the Peltier element composite 108.

At a downstream air side of the Peltier element composite 108, a first and a second inside and outside switching doors 109a and 109b are disposed. The first inside and outside air switching door 109a adjusts the outside air amount introduced from the outside air guide path 113 and the inside air amount introduced from the inside air guide path 114, and the second inside and outside air switching door 109b adjusts the outside air amount introduced from the outside air guide path 113 and the inside air amount introduced from the second inside air inlet 132.

At downstream air sides of air of the first and second inside and outside air switching doors 109a and 109b, a blower 104 is disposed. A first air passage 111 for communicating a first blowing portion 141 of the blower 104 with the foot air outlet 105 and a second air passage 112 for communicating a second blowing portion 142 of the blower 104 with the face air outlet 106 are defined and formed by a second partitioning member 110 provided at a downstream air side of the blower 104.

The blower 104 includes a first blowing portion 141 for sucking air on the side of the first inside and outside air switching door 109a to supply the air to the first air passage 111 side, and a second blowing portion 142 for sucking air on the side of the second inside and outside air switching door 109b to supply the air to the second air passage 112 side, and these two first and second blowing portions 141 and 142 are simultaneously rotated by means of a motor 143.

At an downstream air of the blower 104, an evaporator 120 is disposed so as to close entirely the first and second air passages 111 and 112, and at a downstream air side of the evaporator 120, a heater core (a heating heat-exchanger) 122 is disposed so as to close a part of the first and second air passages 111 and 112. More specifically, the heater core 122 closes approximately a half of the second partitioning plate 110 side of the first and second air passages 111 and 112, and bypass passages 123a and 123b are formed at an upper part and a lower part in FIG. 8 of the heater core 122. The ratio between an amount of air supplied to the bypass passages 123a and 123b and an amount of air supplied to the heater core 122 is adjusted by means of the air mix doors 121a and 121b disposed at an upstream air side of the heater core 104 to adjust the temperature of blown out air. The air mix doors 121a and 121b are simultaneously driven so as to be opened or closed in linear symmetry about the second partitioning member 110.

A foot switching door 151, a face switching door 161 and a defroster switching door 171 are disposed on the foot air outlet 105, the face air outlet 106 and the defroster air outlet 107, respectively, so that the air outlets 105, 106 and 107 are opened or closed by these switching doors 151, 161 and 171, respectively. An opening 110a for communicating the first air passage 111 with the second air passage 112 is formed in the second partitioning member 110, and the foot switching door 151 simultaneously opens or closes the opening 110a.

A dashboard (not shown) provided on the front surface in the passenger compartment has an operating portion of the air conditioning apparatus, and the operating portion is provided with an air outlet mode switching switch 190 for switching the air outlet modes. The air outlet mode switching switch 190 is selected and operated by the passenger. The air outlet modes include a foot mode for blowing out conditioned air mainly from the foot air outlet 105 and blowing out a small amount from the defroster air outlet 107, a foot/def mode for blowing out substantially the same amount of conditioned air from the foot air outlet 105 and the defroster air outlet 107, a defroster mode for blowing out conditioned air from the defroster air outlet 107, a bi-level mode for blowing out substantially the same amount of conditioned air from the face air outlet 106 an the foot air outlet 105, and a face mode for blowing out conditioned air from the face air outlet 106.

When an output signal of the air outlet mode switching switch 190 is input to a control device 189, the foot switching door 151, the face switching door 161 and the defroster switching door 171, and the first and second inside and outside switching doors 109a and 109b are controlled by the control device 189 according to the aforementioned modes.

Further, the turning on or off of the switch 187 of the Peltier element composite 108 in this embodiment is also controlled by the control device (determination means) 189. More specifically, when modes required to maintain the defrosting of the windshield while effectively reducing the heating load, i.e. the foot mode or the foot/def mode in this embodiment is selected by the air outlet mode switching switch 190, the control device 189 controls so that the switch 187 of the Peltier element composite 108 is turned on.

Figure 9A:
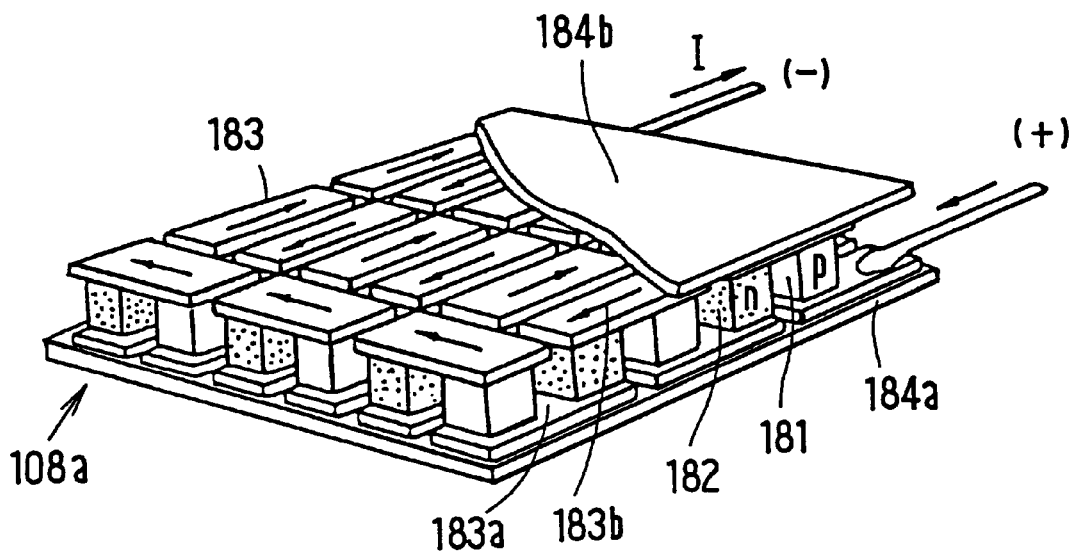
FIG. 9A is a perspective view showing a module structure of a Peltier element.

A structure of the Peltier element composite 108 will be described in detail hereinafter with reference to FIGS. 9 and 10. FIG. 9A shows a module structure 8a including a Peltier element, and FIG. 9B shows one unit of the Peltier element composite 108.

First, as shown in FIG. 9A, the module structure 8a including the Peltier element is constructed such that a configuration in which a P-type semiconductor 181 and an N-type semiconductor 182 are connected in series by an electrode 183 is sandwiched by rectangular alumina insulating substrates 184a and 184b. An electrode 183a at a portion in which an electric current flows from the N-type semiconductor 182 to the P-type semiconductor 181 is collected on the alumina insulating substrate 184a side at the lower part in FIG. 9A, and an electrode 183b at a portion in which an electric current flows from the P-type semiconductor 181 to the N-type semiconductor 182 is collected on the alumina insulating substrate 184b side at the upper part in FIG. 9A.

Figure 9B:
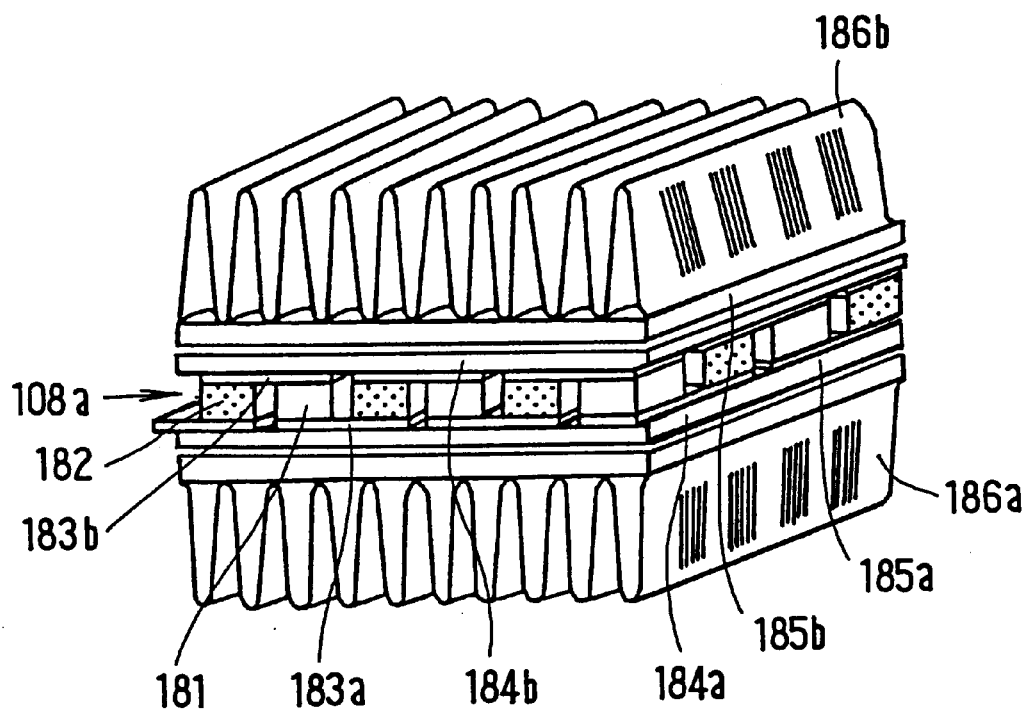
FIG. 9B is a perspective view showing one unit of a Peltier element composite.

As shown in FIG. 9B, fins 186a and 186b made of aluminum are mounted on the alumina insulating substrates 184a and 184b of the module structure 108a through aluminum substrates 185a and 185b to constitute one unit of the Peltier element composite 108 in this embodiment.

A film (not shown) made of a material having an excellent heat conductivity, for example, such as silver, silicon or the like, is formed on the surface of the aluminum substrates 185a and 185b. A film made of an insulating material having an excellent heat conductivity is also formed on the aluminum insulating substrates 184a and 184b. In this way, the transfer of heat between the module structure 108a and the fins 186a and 186b is improved.

When an electric current flows into the module structure 108a, the electrode 183a radiates heat, and the electrode 183b absorbs heat. At this time, the amount of radiant heat is the same as that of the absorbed heat. In this way, for example, the amount of absorbed heat on the heat absorbing side can be increased by increasing the radiant amount on the radiant side compulsorily.

Since each of the alumina insulating substrates 184 and 184b, the aluminum substrates 185a and 185b, and the fins 186a and 186b is made of a material having an excellent heat transfer characteristics, the electrode 183a absorbs heat on the fin 186 side through the alumina insulating substrate 184a and the aluminum substrate 185a, and heat generated by the electrode 183b is transferred to the fin 186b side through the alumina insulating substrate 184b and the aluminum substrate 185b.

Figure 10:
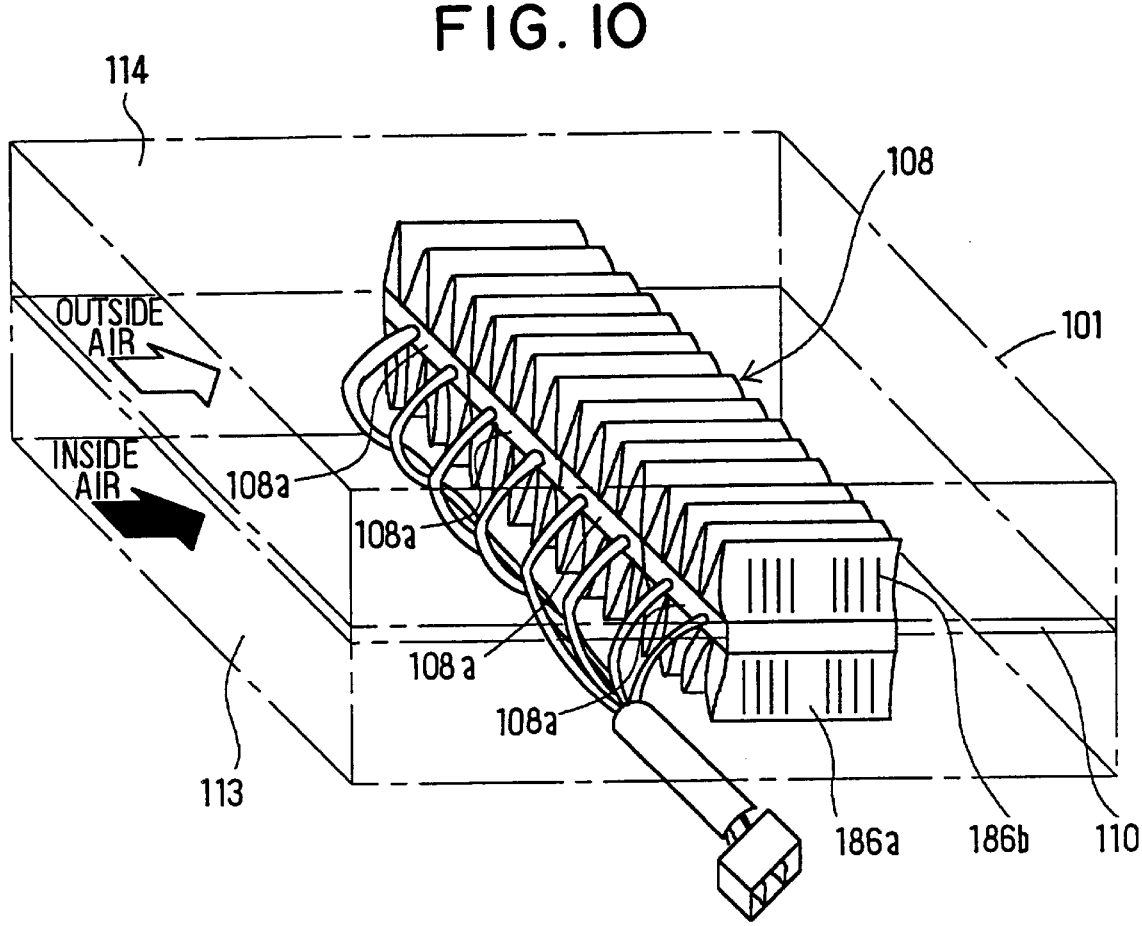
FIG. 10 is a perspective view showing a mounting construction of the Peltier element composite.

In FIG. 10, a plurality of the above-mentioned one units are electrically connected in parallel so that the module structure 108a is arranged on one plane to constitute the Peltier element composite 108, and the Peltier element composite 108 is provided on the first partitioning member 110' so that the fin 186a and the fin 186b are arranged on the inside air guide path 114 side and the outside air guide path 113 side, respectively.

When an electric current flows into the Peltier element composite 108, heat of inside air introduced into the inside air guide path 114 is absorbed by the Peltier element composite 108, the inside air is cooled and dehumidified, heat is emitted to the outside air introduced into the outside air guide path 114, and the outside air is heated. A power supply of the Peltier element composite 108 includes a battery 188 mounted on the vehicle.

An operation of this embodiment constructed as the above will be described.

In FIG. 8, when the foot mode is selected by the air outlet mode switching switch 190, the control device 189 controls so that only the inside air from the second inside air inlet 132 is introduced into the first air passage 111 by the first inside and outside switching door 109a, and the outside air from the outside air guide path 113 and the inside air from the inside air guide path 114 are introduced into the second air passage 112 by the second inside and outside switching door 109b.

The control device 189 further so controls that the foot air outlet 105 is opened by the foot switching door 151 and at the same time, the opening 110a of the second partitioning member 110 is closed, the face air outlet 106 is closed by the face switching door 161, the defroster air outlet 107 is slightly opened by the defroster switching door 171, the bypass passages 123a and 123b are closed by the air mix doors 121a and 121b in the maximum heating operation, and all the air having passed through the evaporator 120 passes through the heater core 122.

Heat of inside air having a relatively high humidity in the inside air guide path 114 is absorbed by the Peltier element composite 108 through the fin 186a on the heat absorbing side of the Peltier element composite 108, and heat generated by the Peltier element composite 108 is emitted to outside air having a relatively low humidity in the outside air guide path 113 through the fin 186b on the radiating side, thereby the outside air being heated. Electric power charged to the Peltier element composite is approximately 200 to 300 W.

In the vicinity of the fin 186a on the heat absorbing side, water vapor contained in the inside air becomes dewed into a condensed liquid. The condensed liquid is adhered to the surface of the fin 186a, drops downward along the fin 186a, and is drained outside the vehicle through the drain formed at the lower part of the Peltier element composite 108 in the casing 1. In this manner, the inside air in the inside air guide path 114 is dehumidified, and the dehumidified inside air is introduced into the second air passage 112. Only the portion which absorbed heat is radiated into the outside air in the outside air guide path 113, and the thus heated outside air is also introduced into the second air passage 112. Joule heat generated in the module structure 108a formed from a Peltier element is also emitted to outside air lower in temperature than inside air.

Figure 11:
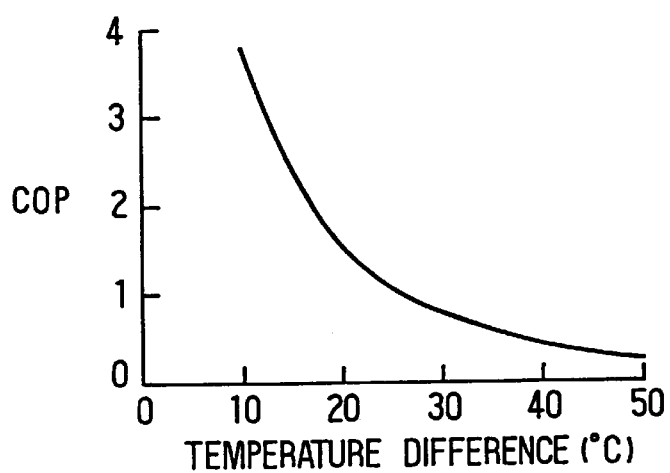
FIG. 11 is a graph showing the coefficient of performance of the module structure of the Peltier element.

FIG. 11 shows a graph relating to a theoretical coefficient of performance COP (=Q/W, Q: the transferred amount of heat from the heat absorbing side to the radiating side of the Peltier element, and W: the electric power charged into the Peltier element) of the module structure of the Peltier element (Reference: "Thermoelectric Semiconductor and its Application" written by Kinichi Kamimura and Isao Nishida, published by Nikkan Kogyo Newspaper Ltd.). In this graph, the axis of abscissae indicates a temperature difference between the temperature on the radiating side and the temperature on the heat absorbing side of the module structure 108a. It is understood from the graph that the greater the temperature difference is, the smaller the coefficient of performance is.

As described above, on the radiating side of the Peltier element composite 108, heat is emitted to the outside air at a relatively low temperature (about −100° C. to 0° C.), while on the heat absorbing side of the Peltier element composite 108, heat is absorbed from the inside air at a relatively high temperature (about 25° C.). That is, since the radiating side of the Peltier element composite 108 is cooled by the outside air, and the heat absorbing side of the Peltier element composite 108 is heated by the inside air, it is possible to reduce a temperature difference between the radiating side and the heat absorbing side of the Peltier element composite 108.

It has been assured by the inventors that, when the electric power charged to the Peltier element composite 108 is approximately 200 to 300 W, the temperature difference is approximately 0 to 10° C. In this embodiment, the fin 186b on the radiating side and the fin 186a on the heat absorbing side of the Peltier element composite 108 are disposed in the outside air guide path 113 and the inside air guide path 114, respectively. In this way, the operation can be performed with high efficiency, i.e., the coefficient of performance COP of the Peltier element composite 108 is 3 or more.

Thus, even if the temperature difference between the inside air and the outside air is small, the dehumidifying operation can be fully performed. It is therefore possible to absorb heat from the inside air having a relatively high humidity to cool and dehumidify the inside air effectively. It is possible to blow out conditioned air including the inside air after dehumidified and the outside air having a relatively low humidity from the defroster air outlet 107, thereby preventing the frost of the windshield.

Further, heat is absorbed from the inside air in the inside air guide path 114 and as a result the heating load of the inside air increases, however, the outside air in the outside air guide path 113 is radiated and as a result the heating load of the outside air is reduced. In this way, in the casing 101, an increase in the heating load on the inside air side can be offset by an decrease in the heating load on the outside air side.

On the other hand, the dehumidifying operation can be fully performed by the Peltier element composite 108, and therefore it is possible to effectively perform the dehumidification of the inside air to sufficiently increase the amount of inside air introduced into the second air passage 112. The inside air having a small heating load after humidified is introduced into the second air passage 112 which requires to form conditioned air having a low humidity, and the inside air not dehumidified from the second inside air inlet 132 is introduced into the first air passage 111. In this way, the amount of inside air introduced into the casing 101 can be increased sufficiently and the heating performance can be effectively improved.

Since the electric power charged to the Peltier element composite 108 is approximately 200 to 300 W, the power supply for the Peltier element composite 108 can be easily obtained from the battery 188 mounted on the vehicle.

As described above, the Peltier element composite 108 is operated in the foot mode, however, also in the defroster mode, the first and second inside and outside air switching doors 109a and 109b are so controlled that the Peltier element composite 108 is operated to introduce inside air and outside air into the second air passage 112. As a result, the same effect as that of the foot mode can be obtained.

In the case of the face mode, bi-level mode and defroster mode, it is necessary to blow out low humidity conditioned air from the face air outlet 106 or the defroster air outlet 107, these modes do not require a high heating capacity as compared with the foot mode or the foot/def mode, and therefore the control device 89 so controls that the Peltier element composite 108 is not operated and only the outside air from the outside air inlet 102 is introduced into the second air passage 112 by the second inside and outside switching door 109b.

A fourth embodiment of the present invention will be described.

Figure 12:
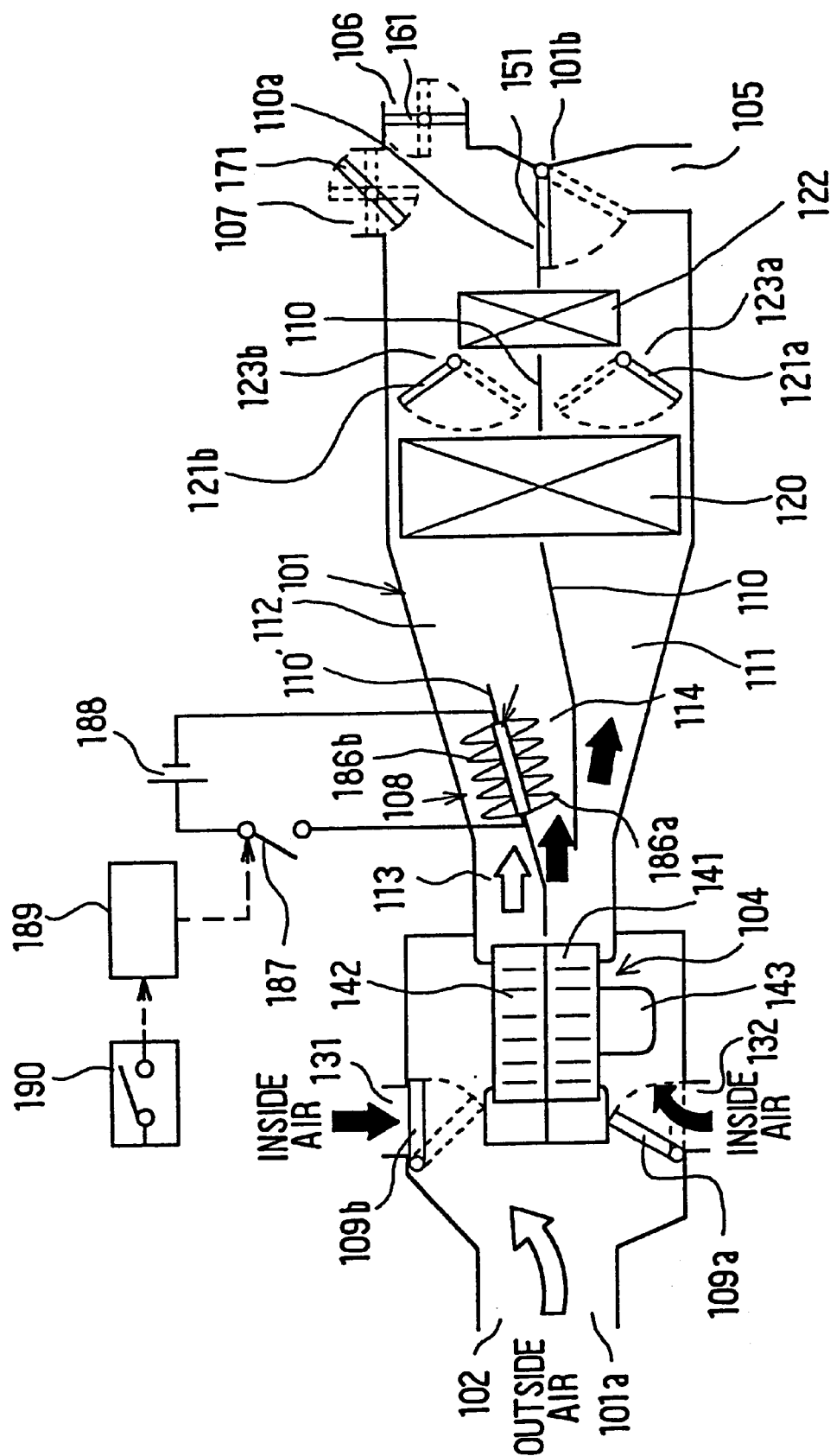
FIG. 12 is a schematic cross sectional view of an air conditioning apparatus for a vehicle according to a fourth embodiment of the present invention.

In the fourth embodiment, as shown in FIG. 12, the first partitioning member 110' in the above-described third embodiment is disposed so as to extend from a boundary line between the first blowing portion 141 and the second blowing portion 142 of the blower 104 to the upstream air side of the evaporator 120, and the second partitioning member 110 is disposed so as to extend from a lower portion in FIG. 12 of the first partitioning member 110' to the center portion of the side surface of the evaporator 120. The Peltier element composite 108 is disposed on the first partitioning member 110'.

In the foot mode, as shown in FIG. 12, the inside air is introduced into the first blowing portion 141 and outside air is introduced into the second blowing portion 102 by the first and second inside and outside switching doors 109a and 109b. At the downstream air side of the blower 104, the inside air is introduced from the first blowing portion 141 into the inside air guide path 114 at the lower part of FIG. 12 of the first partitioning member 110', and outside air is introduced from the second blowing portion 142 into the outside air guide path 113 at the upper part of FIG. 12 of the first partitioning member 110'.

The inside air is cooled and dehumidified by the fin 186a on the heat absorbing side of the Peltier element composite 108, the outside air is heated by the fin 186b on the radiating side, mixed air of the dehumidified inside air and the heated outside air is heated by the heater core 122 and blown out from the defroster air outlet 107.

According to the fourth embodiment, since the amount of inside air introduced into the second air passage 112 can be sufficiently increased similar to the above-described third embodiment, it is possible to effectively improve the heating performance. The introduction ratio of the inside air to all the air amount introduced into the second air passage 112 is determined by the arrangement of the first partitioning member 110' and the second partitioning member 110. The casing 101 is designed in advance so that the introducing ratio is a predetermined introducing ratio.

The Peltier element composite 108 is disposed immediately before the evaporator 120. In this way, a drain for droplets adhered to the evaporator 120, originally provided in the vicinity of the evaporator 120, can be commonly employed as a drain for droplets adhered to the Peltier element composite 108.

A fifth embodiment of the present invention will be described.

In the fifth embodiment, at one end 101a of the casing 101, an outside air inlet 102 and an inside air inlet 103 are provided, and the first partitioning member 110' in the third embodiment is disposed at a downstream air side of the inlets 102 and 103. The inside/outside air switching door 109 is provided at a downstream air side of the Peltier element composite 108, as shown in FIG. 13.

Figure 13:
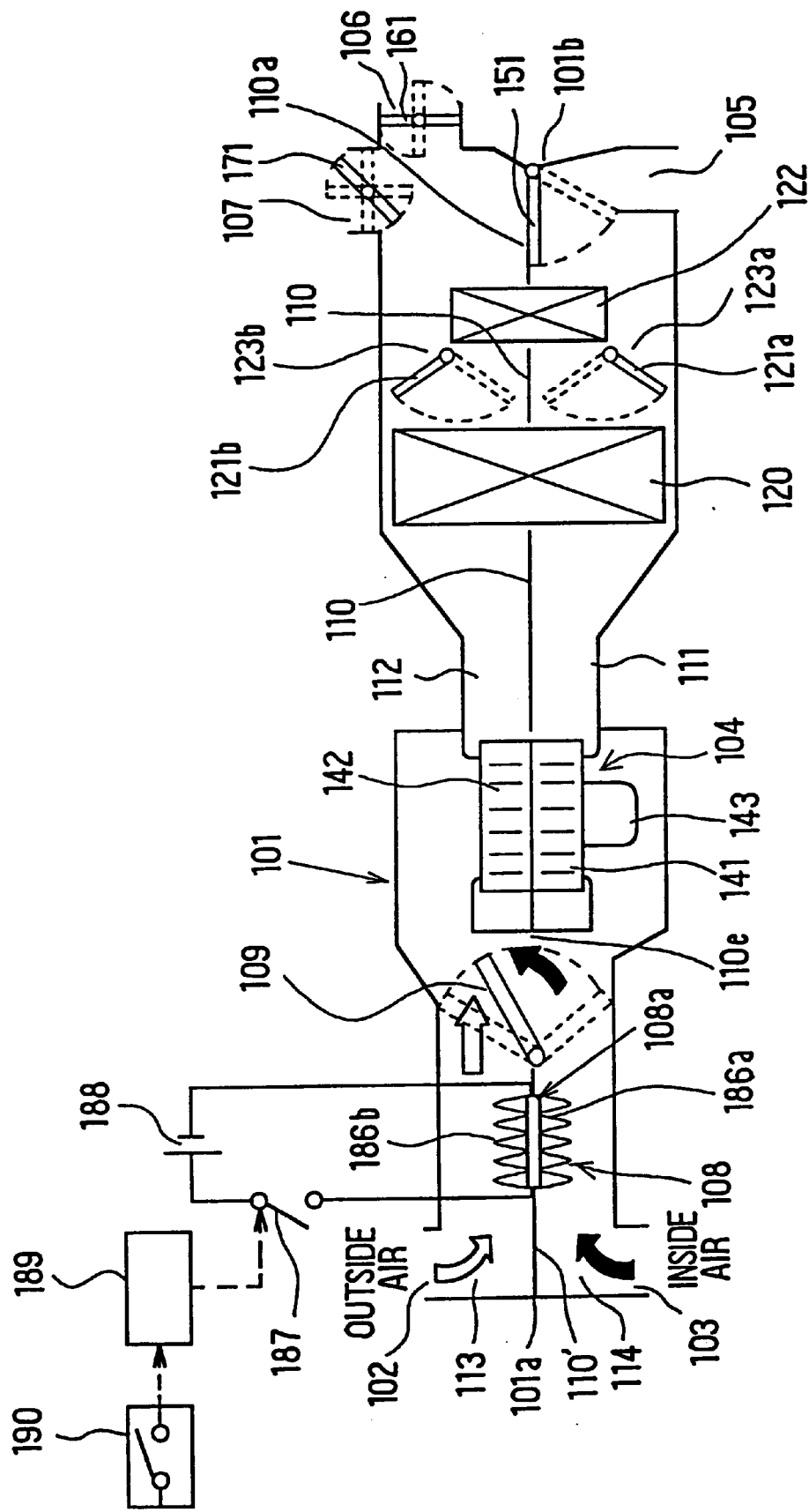
FIG. 13 is a schematic cross sectional view of an air conditioning apparatus for a vehicle according to a fifth embodiment of the present invention.

In the foot mode, as shown in FIG. 13, inside air and outside air are introduced into the inside air guide path 114 and the outside air guide path 113, respectively, the inside air is cooled and dehumidified by the fin 186a on the heat absorbing side of the Peltier element composite 108 and the outside air is heated by the fin 186b on the radiating side. Mixed air of the heated outside air and a small amount of the dehumidified inside air in the second blowing portion 142 is heated by the heater core 122 and blown out of the defroster air outlet 107.

According to the fifth embodiment, the amount of inside air introduced into the second air passage 112 can be sufficiently increased to effectively improve the heating performance. Since the number of the inside and outside air switching door 109 is one, the cost is low.

A sixth embodiment of the present invention will be described.

Figure 14:
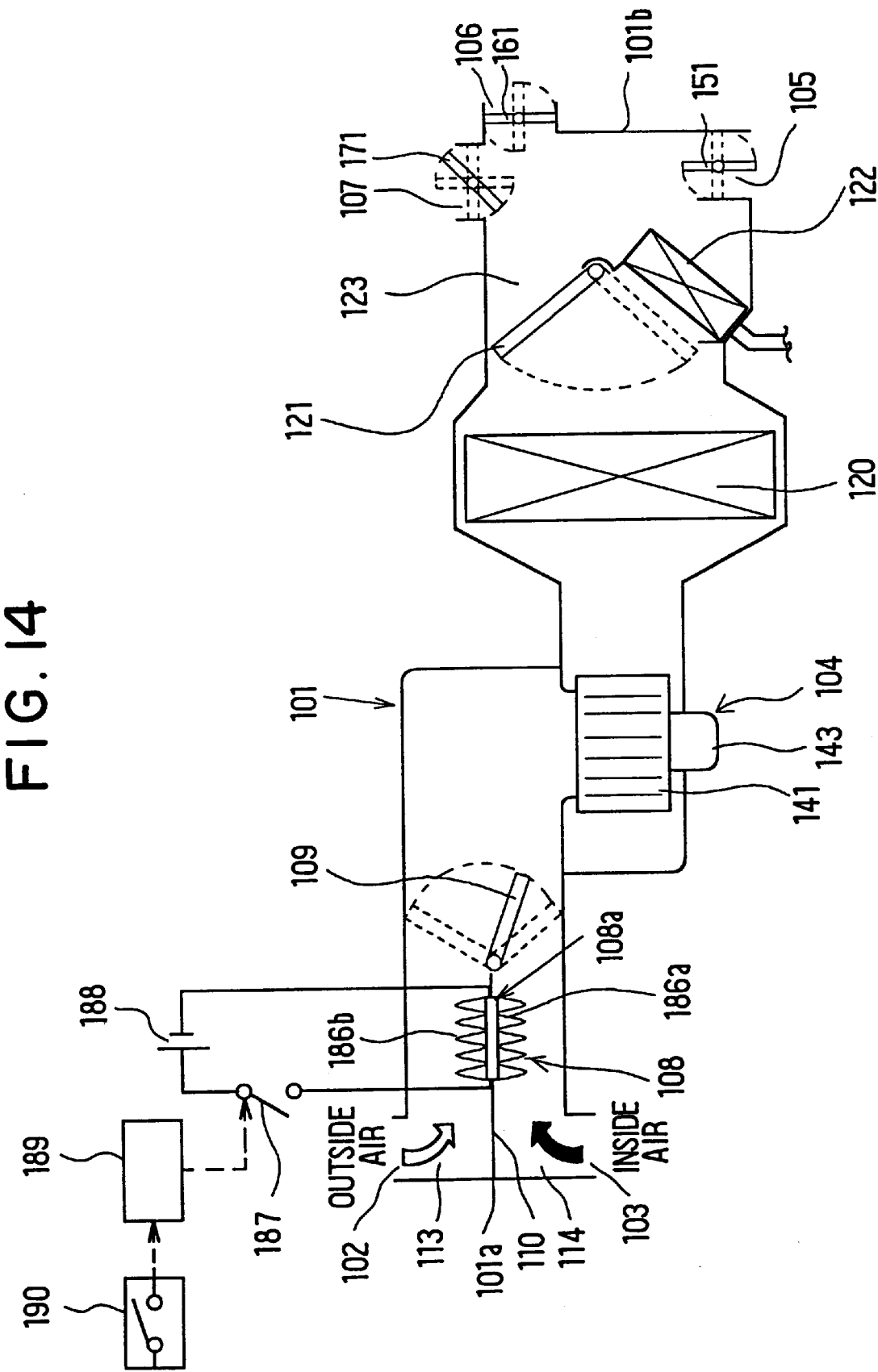
FIG. 14 is a schematic cross sectional view of an air conditioning apparatus for a vehicle according to a sixth embodiment of the present invention.

In the fifth embodiment, the casing 101 is partitioned into the first air passage 111 and the second air passage 112. In the sixth embodiment, however, as shown in FIG. 14, the second partitioning member 110 (see FIG. 13) is eliminated, and the first partitioning member 110' is disposed only in the vicinity of the outside air inlet 102 and the inside air inlet 103. In this way, the blower 104 constituted merely by the blowing portion 104 is used, the heater core 122 is disposed closer to the lower part in FIG. 14, and the number of the air mix door 121 is one.

In the foot mode, as shown in FIG. 14, inside air and outside air are introduced into the inside air guide path 114 and the outside air guide path 113. The inside air is cooled and dehumidified by the fin 186a on the heat absorbing side of the Peltier element composite 108, and the outside air is heated by the fin 186b on the radiating side. A large amount of the heated outside air and a small amount of the dehumidified inside air are introduced into the blower 104 side by the inside and outside switching door 109, and mixed air of the outside air and the inside air is heated by the heater core 122 and blown out of the defroster air outlet 107 and the foot air outlet 105.

According to the sixth embodiment, in the air conditioning apparatus for a vehicle, in which the casing 101 is not partitioned into the first air passage 111 (see FIG. 13) and the second air passage 112 (see FIG. 13), the inside air in the inside air guide path 114 can be dehumidified by the Peltier element composite 108 to sufficiently increase the amount of inside air introduced into the casing 101. Therefore, the heating performance can be effectively improved.

A seventh embodiment of the present invention will be described.

In the third to sixth embodiments, the inside air guide path 114 is disposed parallel to the outside air guide path 113, however, in this embodiment, the inside air guide path 114 is disposed perpendicular to the outside air guide path 113. The Peltier element composite 108 is disposed at a portion where the inside air guide path 114 crosses the outside air guide path 113 perpendicularly.

Figure 15:
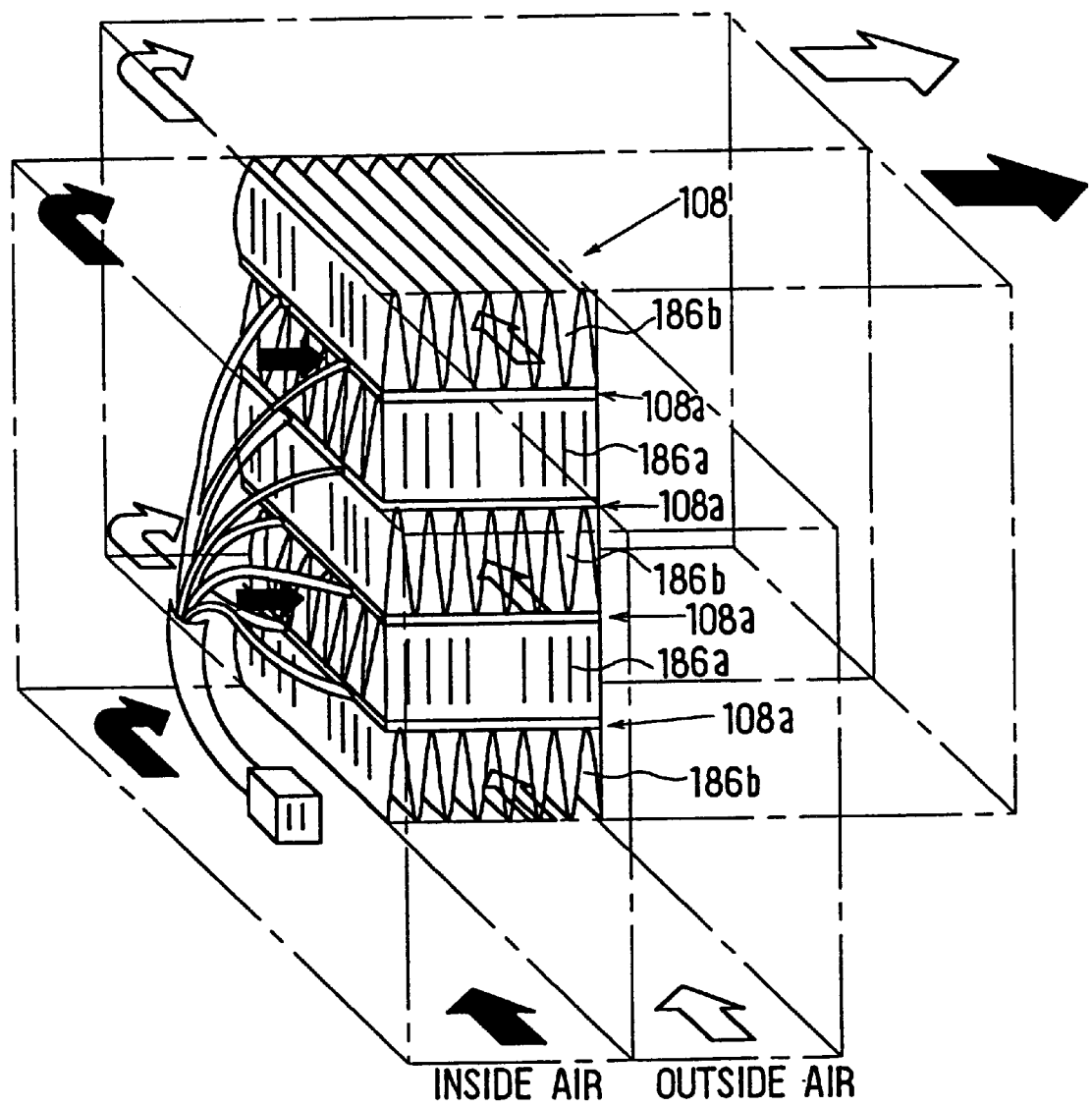
FIG. 15 is a perspective view showing a mounting construction of the Peltier element composite according to a seventh embodiment of the present invention.

More specifically, the outside air flows from this side of paper surface in FIG. 15 to the deep side, and the inside air flows from the right side to the left side in FIG. 15 of the Peltier element composite 108. The fin 186a on the heat absorbing side and the fin 186b on the radiating side are disposed alternately and perpendicular to each other. That is, the fin 186a on the heat absorbing side of the module structure 108a is commonly used as the fin 186a on the heat absorbing side of the module structure 108a adjacent to the module structure 108a. In this manner, for example, four module structures 108a are laminated.

As a result, the inside air flowing from the right side to the left side in FIG. 15 passes through the fin 186a on the heat absorbing side and is heat-absorbed and dehumidified therein, and the outside air flowing from this side to the deep side of paper surface in FIG. 15 passes through the fin 186b on the radiating side and is heated therein.

Figure 16:
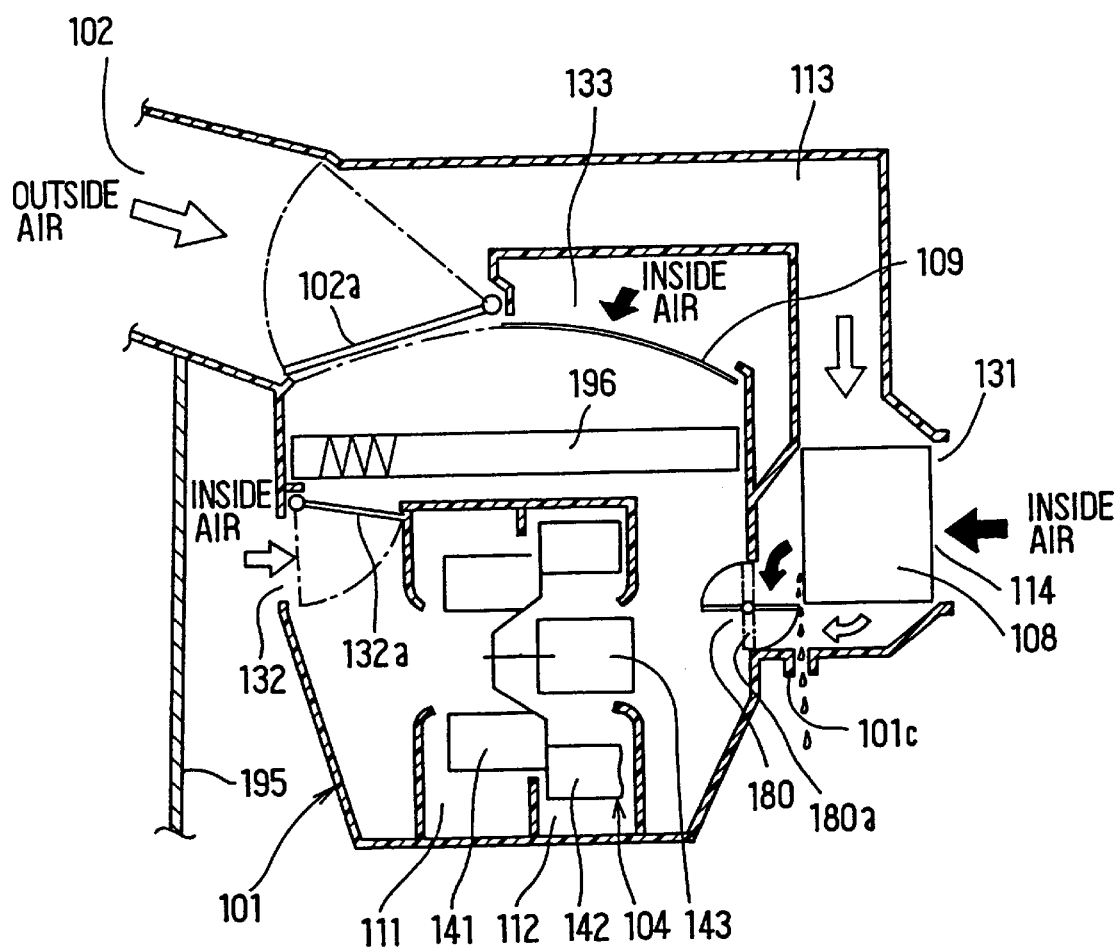
FIG. 16 is a schematic cross sectional view of an air conditioning apparatus for a vehicle according to the seventh embodiment of the present invention.

FIG. 16 shows the casing 101 for accommodating the Peltier element component 108 according to this embodiment. In FIG. 16, the vertical direction of paper is coincident with the actual vertical direction. A partitioning plate 195 partitions the engine compartment from the passenger compartment. The first and second air passages 111 and 112 are bent on the right side of paper at the deep side of paper so as to introduce conditioned air into the passenger compartment.

The casing 101 is formed with a third inside air inlet 133 in addition to the first and second inside air inlets 131 and 132, and further, a pleated filter 196 is disposed in the casing 101 in order to remove dust and a bad smell of the inside air and the outside air. Further, a drain 101c for condensed liquid of the Peltier element composite 108 is also formed. opening/closing doors 102a and 132a are provided in the outside air inlet 102 and the second inside inlet 132 to open or close these outside air and second inside air inlets 102 and 132, an opening 180 as an air passage after the Peltier element composite 108 is provided at a downstream air side of the Peltier element composite 108, and an opening/closing door 180a is provided in the opening 180. Further, an inside and outside air switching door 109 is disposed between the outside air inlet 102 and the third inside air inlet 133.

In the foot mode and the foot/def mode, the Peltier element composite 108 is so operated that the outside air inlet 102 is opened by the door 102a, the third inside air inlet 133 is closed by the inside and outside switching door 109 is closed, and the opening 180 is opened by the door 180a to introduce the dehumidified inside air and the heated outside air into the second air passage 112.

When heating is not necessary, the Peltier element composite 108 is not operated, the outside air inlet 102 is closed by the door 102a, the third inside air inlet 133 is opened by the inside and outside switching door 109, and the opening 180 is closed by the door 180a not to perform the dehumidification and heating operation.

In the case where the temperature of outside air is extremely low (about −20° C.), the radiating amount from the fin 186b (see FIG. 15) on the radiating side of the Peltier element composite 108 becomes extremely large. The heat absorbing amount in the fin 186a (see FIG. 15) is also extremely large. Accordingly, the condensed liquid adhered to the fin 186a on the heat absorbing side may be frozen.

On the other hand, a temperature sensor (not shown) is provided on the fin 186a on the heat absorbing side of the Peltier element composite 108. When the temperature detected by the temperature sensor is a temperature at which condensed liquid is frozen, for example, −13° C., the door 102a is moved in the direction of closing the outside air inlet 102 to reduce the outside air introducing amount. In this way, the radiating amount on the radiating side of the Peltier element composite 108, and the heat absorbing amount on the heat absorbing side lowers accordingly so that the temperature of the fin 186a on the heat absorbing side rises to prevent the condensed liquid from being frozen.

When the detected temperature of the temperature sensor becomes a temperature sufficiently higher than the freezing temperature of condensed liquid and capable of further improving the dehumidifying performance, for example, 3° C., the door 102a is moved in the direction of opening the outside air inlet 102 to increase the outside air introducing amount. In this way, the temperature of the fin 186a on the heat absorbing side lowers to further improve the dehumidifying performance.

In the third embodiment, in the foot mode and the foot/def mode, the Peltier element composite 108 is operated to introduce the inside air and the outside air into the second air passage 112, however, in the case where air conditioning air having a low humidity and a high temperature is preferably blown out from the defroster air outlet 107 as in the defroster mode in a winter season, the Peltier element composite 108 may be operated to introduce the inside air and the outside air into the second air passage 112. As a result, the heating load of air in the second air passage 112 can be reduced as compared with when only the outside air is introduced into the second air passage 112, and this air can be heated efficiently by the heater core 122.

Further, in the third to sixth embodiments, when the evaporator 120 is not operated and when conditioned air having a low humidity is necessary to be blown out from the defroster air outlet 107, the control device 189 may control so that the switch 187 of the Peltier element composite 108 is turned on.

In the above-described third to seventh embodiments, four module structures 108a are laminated to form the Peltier element composite 108, however, the Peltier element composite 108 may be formed by a single module structure 108a, and five or more module structures 8a may be laminated to form the Peltier element composite 108.

Further, in the seventh embodiment, the outside air inlet 102, the outside air guide path 113, the first inside air inlet 131 and the inside air guide path 114 are integrally molded on the casing 101, however, these may be formed separately.

Furthermore, in the above-described embodiments, the inside air guide path 114 and the outside air guide path 113 are disposed parallel to or perpendicular to each other, however, the inside air guide path 114 may be disposed so as to face the outside air guide path 113.

In the module structure 108a (see FIG. 9B) in the above-described embodiment, a heat insulating member for heat insulation between the heat absorbing side and the heat radiating side may be provided in a space between the heat absorbing side and the heat radiating side. This heat insulating member is made of a material having a low heat conductivity, for example, urethane foam. In this way, it is possible to prevent heat from being delivered or received between the heat absorbing side and the radiating side, thereby preventing a temperature difference between the heat absorbing side and the radiating side from decreasing.

An eighth embodiment of the present invention will be described.

Figure 17:
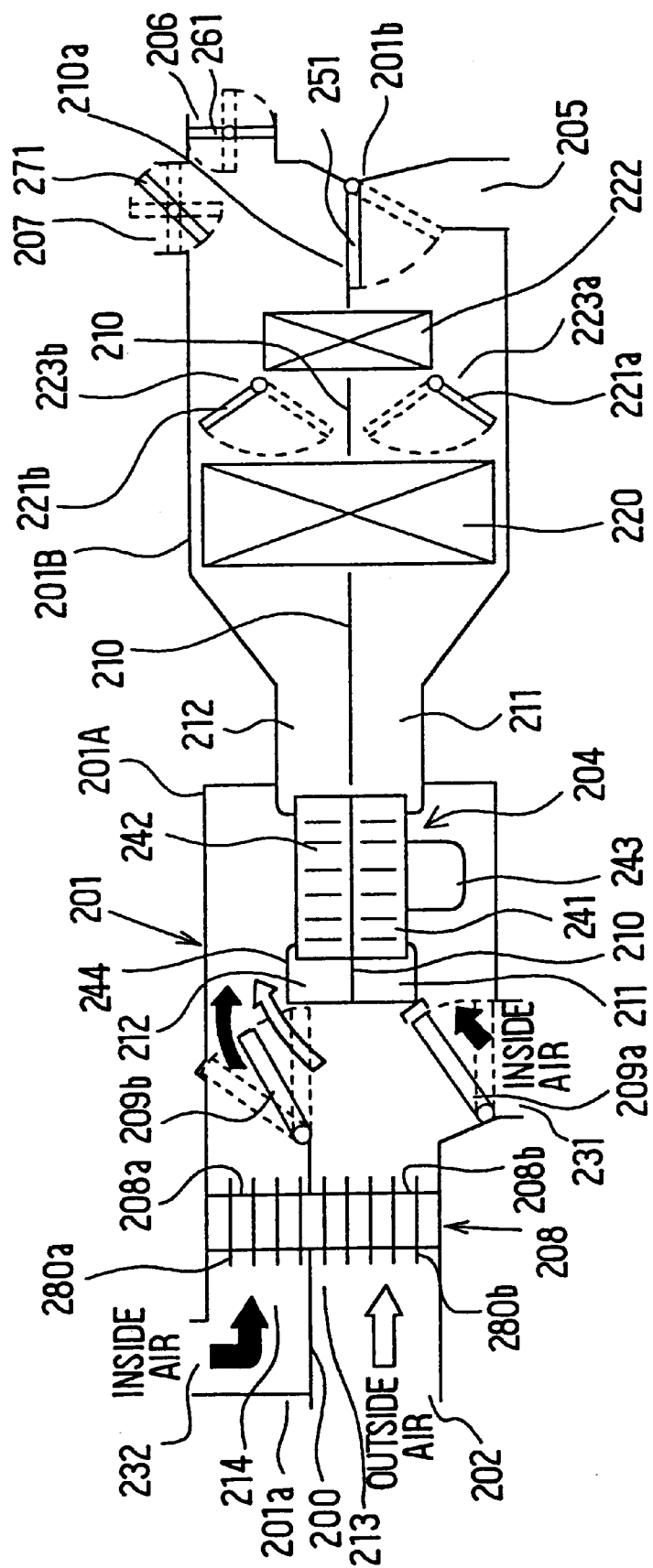
FIG. 17 is a schematic cross sectional view of an air conditioning apparatus for a vehicle according to a eighth embodiment of the present invention.

FIG. 17 is a schematic cross sectional view of an air conditioning apparatus for a vehicle, which is mounted, for example, on a diesel vehicle having a diesel engine thereon.

As shown in FIG. 17, the air conditioning apparatus for a vehicle is provided with a casing 201 made of resin, which forms an air passage for introducing air toward the passenger compartment. This casing 201 includes an inside and outside air switching portion 201A and an air conditioning unit portion 201B, which are connected to each other. At one end 201a of the casing 201, an outside air inlet 202, a first inside air inlet 231 and a second inside air inlet 232 are provided, and at the other end 201b, a foot opening 205 communicating with a foot air outlet (not shown) for blowing out conditioned air toward the feet of the passenger, a face opening 206 communicating with a face air outlet (not shown) for blowing out conditioned air toward the upper half part of the body of the passenger, and a defroster opening 207 in communicating with a defroster air outlet (not shown) for blowing out conditioned air toward the windshield.

The inside and outside air switching portion 201a is partitioned by a sub-partitioning plate 200 into an outside air guide path 213 through which outside air from the outside air inlet 202 flows and an inside air guide path 214 through which inside air from the second inside air inlet 232 flows. The sub-partitioning plate 200 is provided with a heat pipe 208 for absorbing heat from inside air in the inside air guide path 214 and radiating heat to the outside air in the outside air guide path 213.

The heat pipe 208 extends through the sub-partitioning plate 200 so as to cross the inside air guide path 214 and the outside air guide path 213. In the heat pipe 208, a heat medium circulates from the heat absorbing portion 208a disposed in the inside air guide path 214 to the heat radiating portion 208b disposed in the outside air guide path 213. The heat absorbing portion 208a of the heat pipe 208 and the heat radiating portion 208b are disposed in the downward direction of gravity and in the upward direction of gravity, respectively.

On the heat absorbing portion 208a side, the heat medium absorbs heat from relatively high temperature inside air and is evaporated. The gravity of the heat medium which have been evaporated becomes small, and the heat medium moves toward the upper heat radiating portion 208b side. Then, on the heat radiating portion 208b side, the medium radiates heat to the outside air at a relatively low temperature and becomes condensed and the heat medium. The gravity of the condensed becomes large, and the heat medium moves toward the lower heat absorbing portion 208a side. In this manner, the heat medium circulates in the heater pipe 208.

On the surface of the heat absorbing portion 208a and the heat radiating portion 208b of the heat pipe 208 are provided heat transfer fins 280a and 280b for facilitating heat exchange between the heat medium, and inside air and outside air. In the casing 201, a drain (not shown) for droplets adhered to the heat pipe 208 is formed at a portion located below the heat pipe 208.

At a downstream side of the heat pipe 208, a first and a second inside and outside switching doors 209a and 209b are disposed. The inside and outside switching door 209b is disposed at a downstream end of the sub-partitioning plate 200 to adjust the introduction ratio between an amount of the introduced outside air from the outside air guide path 213 and an amount of the introduced inside air from the inside air guide path 214. The inside and outside switching door 209a is disposed in the vicinity of the first inside air inlet 231 to adjust the introduction ratio between an amount of the introduced outside air from the outside air guide path 213 and an amount of the introduced inside air from the second inside air inlet 232.

At downstream air sides of the first and second inside and outside air switching doors 209a and 209b, a blower 204 is disposed. The blower 204 generates an air flow from one end 201a to the other end 201b of the casing 201 and includes centrifugal multiblade fans 241 and 242, a fan driving motor 243 and a resin-made scroll casing 244. The scroll casing 244 is partitioned by a partitioning plate 210 into a first air passage 211 through which blowing air of the centrifugal multiblade fan 241 flows and a second air passage 212 through which blowing air of the centrifugal multiblade fan 242 flows.

As a result, outside air in the outside air guide path 213 or inside air from the first inside air inlet 231 is introduced into the first air passage 211, and outside air in the outside air guide path 213 or inside air from the inside air guide path 214 is introduced into the first air passage 212. The first and second air passages 211 and 212 further extend toward the other end 201b of the casing 201, the first air passage 211 is communicated with the foot opening 205, and the second air passage is communicated with the face opening 206 and the defroster opening 207.

In the air conditioning unit 201B, at a downstream air side of the blower 204, an evaporator 220 is disposed so as to close entirely the first and second air passages 211 and 212, and at a downstream air side of the evaporator 220, a heater core 222 is disposed so as to close a part of the first and second air passages 211 and 212. More specifically, the heater core 222 closes approximately the half on the partitioning plate 210 side of the first and second air passages 211 and 212. In the casing 201, bypass passages 223a and 223b are formed at an upper part and at a lower part in FIG. 17 of the heater core 222. Air mix doors 221a and 221b disposed at a downstream air side of the evaporator 220 and at an upstream air side of the heater core 222 adjust the ratio of an amount of air supplied to the bypass passages 223a and 223b and an amount of the air supplied to the heater core 222 to adjust the temperature of blown-out air. The air mix doors 221a and 221b are simultaneously driven so that these are opened or closed in linear symmetrically about the partitioning plate 210.

The foot opening 205, the face opening 206 and the defroster opening 207 are provided with a foot switching door 251, a face switching door 261 and a defroster switching door 271, respectively, so that the openings 205, 206 and 207 are opened or closed by these switching doors 251, 261 and 271, respectively. The partitioning plate 210 is formed with a communication port 210a for communicating between the first air passage 211 and the second air passage 212, and the foot switching door 251 simultaneously opens or closes the communication port 210a.

On a dashboard (not shown) provided on the front surface of the passenger compartment, an operating portion for the air conditioning apparatus is provided, and the operating portion is provided with an air outlet mode switching switch (not shown) for switching air outlet modes, and an air temperature setting switch for instructing a temperature of air blown out into the passenger compartment.

The air outlet mode switching switch is selected and operated by the passenger. The air outlet modes include a foot mode for blowing out conditioned air mainly from the foot opening 205 and blowing out a small amount of conditioned air from the defroster opening 207, a foot/def mode for blowing out substantially the same amount of conditioned air from the foot opening 205 and the defroster opening 207, a defroster mode for blowing out conditioned air from the defroster opening 207, a bi-level mode for blowing out substantially the same amount of conditioned air from the face opening 206 and the foot opening 205, and a face mode for blowing out conditioned air from the face opening 206.

Operating signals of the air outlet mode switching switch, the air temperature setting switch and the like are transmitted to the control device (not shown). The control device performs a predetermined operation on the basis of the operating signals, and outputs, on the basis of the result of operation, control signals to the foot switching door 251, the face switching door 261, the defroster switching door 271, the first and second outside air switching doors 209a, 209b, and the air mix doors 221a, 221b to operate and control these doors.

An operation of this embodiment constructed as described above will be described.

When the foot mode is selected by the air outlet mode switching switch, the first and second inside and outside air switching doors 209a, 209b are controlled by the control device as shown by the solid line in FIG. 17 so that only the inside air from the first inside air inlet 231 is introduced into the first air passage 211, and the outside air from the outside air guide path 213 and the inside air from the inside air guide path 214 are introduced into the second air passage 212.

At the same time, the foot switching door 251, the face switching door 261 and the defroster switching door 271 are controlled by the control device as shown by the solid line in FIG. 17 so that the foot opening 205 is fully opened, the communication port 210a of the partitioning plate 210 is closed, the face opening 206 is closed, and the defroster opening 207 is slightly opened. For example, in the maximum heating operation, the air mix doors 221a and 221b are controlled by the control device as shown by the solid line in FIG. 17 so that the bypass passages 223a and 223b are closed and all the air having passed through the evaporator 220 passes through the heater core 222.

In the heat pipe 208, the heat absorbing portion 208a absorbs heat from the inside air having a relatively high humidity, and the heat radiating portion 208b radiates heat to the outside air having a relatively low humidity. As a result, the inside air flowing through the inside air guide path 214 is cooled and dehumidified, and the outside air flowing through the outside air guide path 213 is heated. Then, the water vapor in the inside air becomes dewed into condensed liquid, and the condensed liquid is adhered to the surface of the heat transfer fin 280a of the heat absorbing portion 208a, falls down along the surface, and is discharged outside the vehicle through the drain.

Then, the conditioned air which is mixed of the inside air after dehumidified and the outside air having a relatively low humidity is blown out from the defroster opening 207. In this way, it is possible to reduce the heating load of the heater core 222 while defrosting the windshield.

Heat is absorbed from the inside air in the inside air guide path 214, and the temperature of the inside air lowers. The heat is emitted to the outside air in the outside air guide path 213, and the temperature of the outside air rises. In the casing 201, the lowering of temperature of the inside air can be offset by the rise of temperature of the outside air.

Since the inside air of relatively high temperature in addition to the outside air of relatively low temperature are introduced into the second air passage 212, a difference of temperature between the second air passage 212 and the first air passage into which only the inside air is introduced can be reduced. Accordingly, a temperature difference between air blown out into the passenger compartment from the foot opening 205 and air blown into the passenger compartment from the defroster opening 207 can be reduced, thus suppressing a problem in that a heating feeling of the passenger is impaired.

It has been assured from experimentation performed by the inventors that in this embodiment, for example, by setting a temperature of outside air to −20° C., a relative humidity of outside air to 100% (absolute humidity: 0.6 g/kg), a temperature of inside air to 2 ° C., a relative humidity of inside air to 30% (absolute humidity: 5.9 g/kg), an amount of introduced outside air from the outside air inlet 202 to 90 m$^3$/h, an amount of introduced inside air from the first inside air inlet 231 to 80 m$^3$/h, and an amount of introduced inside air from the second inside air inlet 232 to 30 m$^3$/h, the defrosting of the windshield in the passenger compartment can be maintained.

It has been found that the dehumidification amount dehumidified by the heat pipe 208 is 165 g/h, and the dehumidifying operation can be performed effectively. It is generally known that radiation in the heat radiating portion 208b of the heat pipe 208 can be facilitated to improve the dehumidifying capacity of the heat pipe 208. The amount of outside air to the heat radiating portion 208b of the heat pipe 208 is greatly increased as compared with the amount of inside air to the heat absorbing portion 208a of the heat pipe 208, and the dehumidifying capacity of the heat pipe 208 can be improved effectively.

In the above-described operation, the heat pipe 208 is operated in the foot mode. Also, in the defroster mode, the heat pipe 208 is operated so that the first and second inside and outside switching doors 209a and 209b are controlled so that the inside air and the outside air are introduced into the second air passage 212. As a result, the same effect as that in the foot mode can be obtained.

In the case of the face mode, the bi-level mode and the defroster mode, conditioned air having a low humidity needs be blown out from the face opening 206 or the defroster opening 207, a large amount of heating capacity is not required in these mode as compared with the foot mode and the foot/def mode, and therefore, only the outside air from the outside air inlet 202 is introduced into the second air passage 212, and the heat pipe 208 is not operated.

A ninth embodiment of the present invention will be described with reference to FIG. 18.

Figure 18:
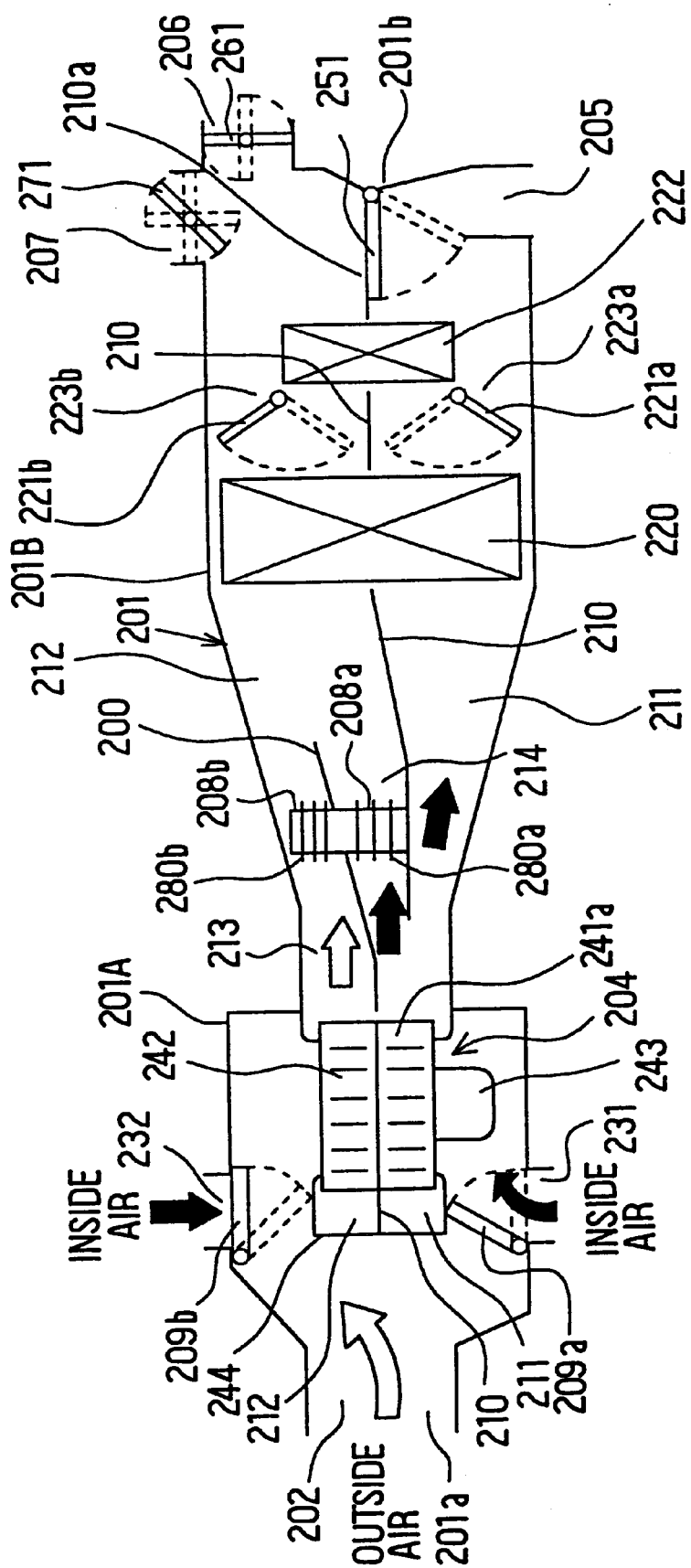
FIG. 18 is a schematic cross sectional view of an air conditioning apparatus for a vehicle according to a ninth embodiment of the present invention.

As shown in FIG. 18, an outside air guide path 213 and an inside air guide path 214 are formed at a downstream side of the blower 204. The sub-partitioning plate 200 extends from a boundary line between the centrifugal multiblade fan 241 and the centrifugal multiblade fan 242 of the blower 204 toward the downstream side, and partitions the casing 201 at a downstream side of the blower 204 into the centrifugal multiblade fan 241 and the centrifugal multiblade fan 242. The space on the centrifugal multiblade fan 241 side partitioned by the sub-partitioning plate 200 is further partitioned into two parts by the neighbor portion of the blower 204 of the partitioning plate 210.

In this way, the downstream side of the blower 204 is defined and formed into a first air passage 211 in which inside air from the first inside air inlet 231 is at least introduced through the centrifugal multiblade fan 241, and an inside air guide path 214 in which inside air once introduced into the first air passage 211 is at least introduced, and an outside air guide path 213 in which outside air from the outside air inlet 202 is at least introduced through the centrifugal multiblade fan 242.

In the foot mode, the first and second inside and outside switching doors 209a and 209b are moved to a position indicated by the solid line in FIG. 18, and as a result, inside air is introduced into the centrifugal multiblade fan 241, and outside air is introduced into the centrifugal multiblade fan 242. Then, inside air not dehumidified, inside air dehumidified by the heat pipe 208 and outside air heated by the heat pipe 208 are introduced into the first air passage 211 and the second air passage 212, respectively.

In this way, the same effect as that in the above-described eighth embodiment is obtained. The introduction ratio of the inside air to all the air introduced into the second air passage 212 is determined by the arrangement of the sub-partitioning plate 200 and the partitioning plate 210. The casing 210 is designed in advance so as to obtain a predetermined introduction ratio.

The heat pipe 208 may be disposed immediately before the evaporator 220. In this way, a drain for droplets adhered to the evaporator 220, originally provided in the vicinity of the evaporator 220, can be commonly employed as a drain for droplets adhered to the heat pipe 208.

A tenth embodiment of the present invention will be described with reference to FIG. 19.

In the tenth embodiment, only one inside air inlet 203 is formed at one end 201a of the casing 201. The inside air guide path 214 in each of the eighth and ninth embodiments is eliminated. An interior of the casing 201 is defined and formed by the partitioning plate 210 into a first air passage 211 having an one end into which inside air from the inside air inlet 203 is introduced and the other end which communicates with the foot opening 205, and a second air passage 212 having one end into which outside air from the outside air inlet 202 is introduced and the other end which communicates with the defroster opening 207.

At downstream sides of the outside air inlet 202 and the inside air inlet 203, there is disposed a heat pipe 208 extending through the partitioning plate 210 so as to cross the first air passage 211 and the second air passage 212. In the partitioning plate 210, at a downstream side of the heat pipe, there is formed a communication port (inside air guide path in claim 2) for communicating between the first air passage 11 and the second air passage 212. An inside and outside air switching door 209 for performing the opening or closing of the communication port 215 and the inside and outside air switching is provided in the vicinity of the communication port 215.

Figure 19:
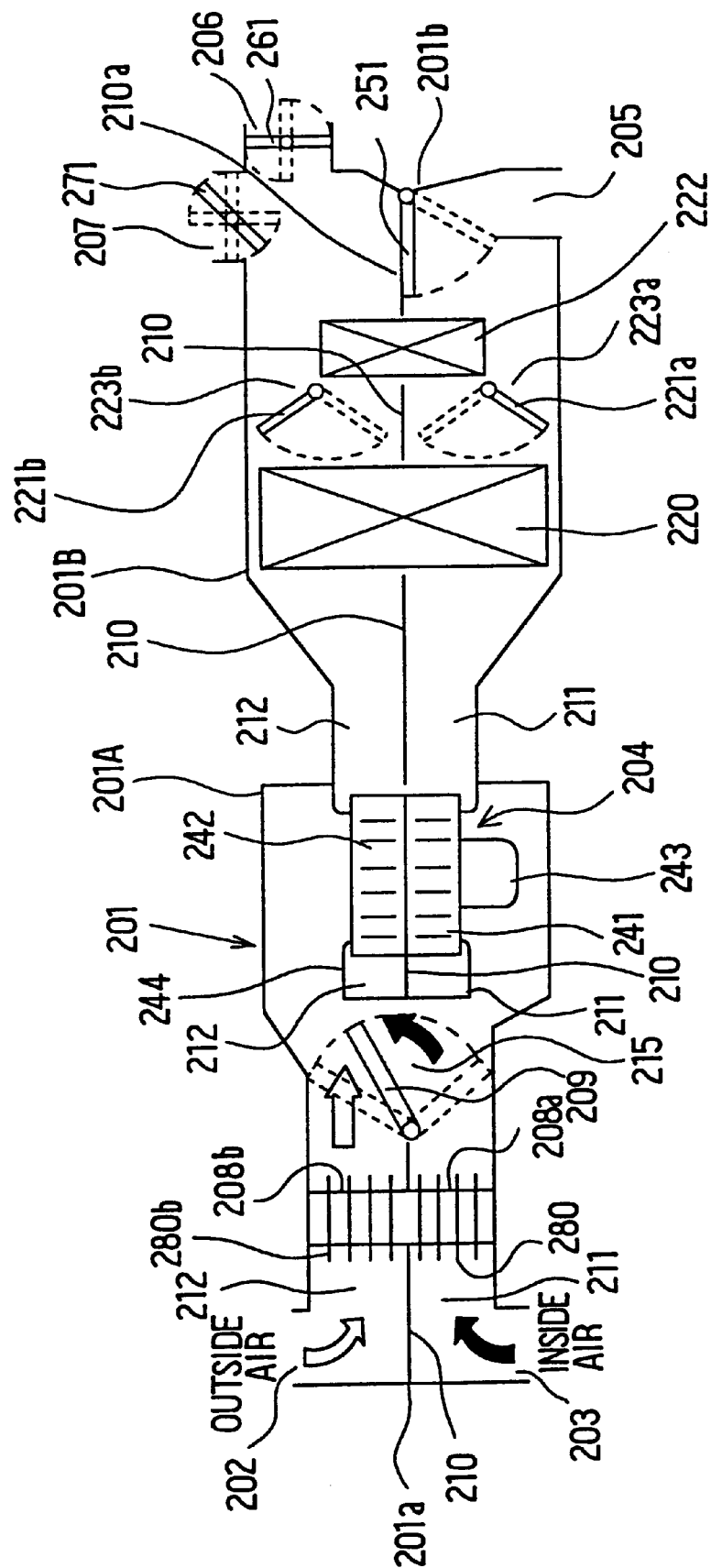
FIG. 19 is a schematic cross sectional view of an air conditioning apparatus for a vehicle according to a tenth embodiment of the present invention.

In the foot mode, as shown in FIG. 19, the inside air and outside air are introduced into the first air passage 211 and the second air passage 212, respectively, the inside air is cooled and dehumidified by the heat transfer fin 280a of the heat absorbing portion 208a of the heat pipe 208, and the outside air is heated by the heat transfer fin 280b of the heat radiating portion 208b. The inside and outside air switching door 209 is disposed at a position shown in FIG. 19, and a part of the inside air in the first air passage 211 is introduced into the second air passage 202 through the communication port 215.

Then, the outside air heated by the heat pipe 208 and a small amount of inside air dehumidified by the heat pipe 208 are introduced into the centrifugal multiblade fan 242, and the inside air dehumidified by the heat pipe 208 is introduced into the centrifugal multiblade fan 241. Since the inside air dehumidified by the heat pipe 208 is introduced into the second air passage 212, the defrosting of the windshield is performed.

In this manner, the ratio of the amount of the inside air in consideration of the defrosting performance to the amount of all the air blown into the passenger compartment can be increased as compared with the conventional type, and the heating performance by the heater core 222 can be improved. Further, not only the outside air but also the dehumidified inside air are introduced into the second air passage 212, and a temperature difference between the second air passage 212 and the first air passage 211 can be reduced as compared with the conventional type.

It has been assured from experimentation performed by the inventors that in this embodiment, for example, by setting a temperature of outside air to −20° C., a relative humidity of outside air to 100% (absolute humidity: 0.6 g/kg), a temperature of inside air to 25° C., a relative humidity of inside air to 30% (absolute humidity: 5.9 g/kg), an introducing amount of outside air from the outside air inlet 202 to 100 m$^3$/h, and an introducing amount of inside air from the inside air inlet 203 to 100 m$^3$/h, the defrosting performance of the windshield in the passenger compartment can be maintained. The dehumidification amount dehumidified by the heat pipe 208 was 10 g/h.

In the eighth and ninth embodiments, the inside air guide path 214 is formed in the casing 201, however, the communication may be formed into the second air passage 212 through the exterior of the casing 201 from the first inside air inlet 231 or the second inside air inlet 232.

Further, in the above-described tenth embodiment, the inside air dehumidified by the heat pipe 208 is introduced into the second air passage 212 by the inside and outside air switching door 209, however, the inside air dehumidified by the heat pipe 208 may be introduced into only the first air passage 212.

In the eighth embodiment, in the foot mode and the foot/def mode, the inside air and the outside air are introduced into the inside air guide path 214 and the outside air guide path 213, respectively, and the heat pipe 208 is operated, however, also in the case where conditioned air having a low humidity and a high temperature is preferably blown out from the defroster air outlet 207 as in the defroster mode in a winter season, the inside air and the outside air may be introduced into the inside air guide path 214 and the outside air guide path 213, respectively, and the heat pipe 208 may be operated. As a result, the heating load of the heating core 222 can be reduced as compared with the case where only the outside air is introduced into the second air passage 212. Moreover, since the inside air introduced into the second air passage 212 is dehumidified by the heat pipe 208, the defrosting of the windshield can be performed.

Further, also in the face mode and the bi-level mode in the above-described eighth embodiment, the inside air and the outside air may be introduced into the second air passage 212, and the heat pipe 208 may be operated, similar to that of the foot mode.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined in the appended claims.

What is claimed is:

1. An air conditioning apparatus for a vehicle having a passenger compartment comprising:

an air conditioning casing, in which an outside air suction inlet and a first inside air suction inlet for sucking an outside air and an inside air, respectively, are formed at one end, and a defroster opening for blowing out air at least toward a windshield of the vehicle and a foot opening for blowing out air toward feet of a passenger in said passenger compartment are formed at the other end, said air conditioning case further having a second inside air suction inlet separated from said first air suction inlet for sucking the inside air;

a partitioning plate for defining and forming an interior of said air conditioning casing into a first air passage formed from said second inside air suction inlet to said foot opening, and a second air passage formed from said outside air suction inlet to said defroster opening;

a heating heat exchanger provided in said first and second air passages to heat air in said first and second air passages;

a blower for generating an air flow from said one end toward said other end in said first and second air passages, said blower having a first suction port and a second suction port; and;

dehumidifying means for dehumidifying the inside air from the first inside air suction inlet; wherein said outside air suction inlet and said first and second inside air suction inlets are provided in said air conditioning casing at an upstream air side of said blower, in such a manner that said first inside air suction inlet communicates with said second suction port of said blower through a communication passage, said outside air suction inlet communicates with said second suction port through said second air passage, and said second inside air suction inlet communicates with said first suction port through said first air passage during an air outlet mode where both said defroster opening and said foot opening are opened, said dehumidifying means being provided in said communication passage; and said dehumidifying means includes an electric element provided in said air conditioning casing so as to face said communication passage and said second air passage, for absorbing heat from the inside air flowing through said communication passage and for radiating the absorbed heat to the outside air flowing through said second air passage, when an electric current is supplied thereto.

2. An air conditioning apparatus according to claim 1, further comprising:

determining means for determining conditions for blowing out a low humidity conditioned air from said defroster opening, wherein, when said conditions are determined by said determining means, said electric element is operated.

3. An air conditioning apparatus for a vehicle having a passenger compartment comprising:

an air conditioning casing, in which an outside air suction inlet and a first inside air suction inlet for sucking an outside air and an inside air, respectively, are formed at one end, and a defroster opening for blowing out air at least toward a windshield of the vehicle and a foot opening for blowing out air toward feet of a passenger in said passenger compartment are formed at the other end, said air conditioning case further having a second inside air suction inlet separated from said first air suction inlet for sucking the inside air;

a partitioning plate for defining and forming an interior of said air conditioning casing into a first air passage formed from said second inside air suction inlet to said foot opening, and a second air passage formed from said outside air suction inlet to said defroster opening;

a heating heat exchanger provided in said first and second air passages to heat air in said first and second air passages;

a blower for generating an air flow from said one end toward said other end in said first and second air passages, said blower having a first suction port and a second suction port; and;

dehumidifying means for dehumidifying the inside air from the first inside air suction inlet; wherein said outside air suction inlet and said first and second inside air suction inlets are provided in said air conditioning casing at an upstream air side of said blower, in such a manner that said first inside air suction inlet communicates with said second suction port of said blower through a communication passage, said outside air suction inlet communicates with said second suction port through said second air passage, and said second inside air suction inlet communicates with said first suction port through said first air passage during an air outlet mode where both said defroster opening and said foot opening are opened, said dehumidifying means being provided in said communication passage; and said dehumidifying means is an electric element provided to face said communication passage and said second air passage, for absorbing heat from the inside air flowing through said communication passage and for radiating the absorbed heat to the outside air flowing through said second air passage, when electric current is supplied thereto.

* * * * *